US012789980B2

(12) United States Patent
Guida

(10) Patent No.: US 12,789,980 B2

(45) **Date of Patent: *Nov. 10, 2026**

(54) MULTIPLE CONTROLLABLE AIRFLOW MODIFICATION DEVICES

(71) Applicant: Tamarack Aerospace Group, Inc., Sandpoint, ID (US)

(72) Inventor: Nicholas R. Guida, Sagle, ID (US)

(73) Assignee: Tamarack Aerospace Group, Inc., Sandpoint, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/443,869

(22) Filed: Feb. 16, 2024

(65) Prior Publication Data

US 2024/0367778 A1 Nov. 7, 2024

Related U.S. Application Data

(63) Continuation of application No. 17/467,125, filed on Sep. 3, 2021, now Pat. No. 11,912,398, which is a continuation of application No. 15/979,331, filed on May 14, 2018, now Pat. No. 11,111,006, which is a continuation of application No. 14/887,139, filed on Oct. 19, 2015, now Pat. No. 9,969,487, which is a (Continued)

(51) Int. Cl.

*B64C 23/06* (2006.01)

*B64C 13/16* (2006.01)

(52) U.S. Cl.

CPC ............ *B64C 23/069* (2017.05); *B64C 13/16* (2013.01); *B64C 23/076* (2017.05); *Y02T 50/10* (2013.01)

(58) Field of Classification Search

CPC ..... B64C 13/16; B64C 23/069; B64C 23/072; B64C 23/076

See application file for complete search history.

(56) References Cited

U.S. PATENT DOCUMENTS

| | | | |
|---|---|---|---|
| 2,074,201 | A | 3/1937 | Bechereau |
| D144,143 | S | 3/1946 | Seott |

(Continued)

FOREIGN PATENT DOCUMENTS

| | | |
|---|---|---|
| DE | 2149956 | 4/1973 |
| DE | 10313290 | 10/2004 |

(Continued)

OTHER PUBLICATIONS

Office Action for U.S. Appl. No. 18/421,610, dated Feb. 25, 2025, 11 Pages.

(Continued)

*Primary Examiner* — Joseph W Sanderson

(74) *Attorney, Agent, or Firm* — Lee & Hayes, P.C.

(57) ABSTRACT

An active wing extension includes a body portion substantially parallel to a wing of an aircraft, as if it were an extension of the wing. The body portion is attachable to an aircraft wing and includes multiple controllable airflow modification devices coupled thereto. By virtue of having multiple controllable airflow modification devices, the wing extension is capable of adjusting control surfaces of the multiple controllable airflow modification devices in response to in-flight conditions, to reduce wing loads, improve wing fatigue characteristics, increase range, and/or increase efficiency.

32 Claims, 14 Drawing Sheets

Related U.S. Application Data continuation of application No. 13/438,614, filed on Apr. 3, 2012, now Pat. No. 9,162,755, which is a continuation-in-part of application No. 13/075,934, filed on Mar. 30, 2011, now Pat. No. 8,684,315, which is a continuation of application No. 12/797,742, filed on Jun. 10, 2010, now abandoned.

(60) Provisional application No. 61/265,534, filed on Dec. 1, 2009.

(56) References Cited

U.S. PATENT DOCUMENTS

| | | | |
|---|---|---|---|
| 2,418,301 | A | 4/1947 | Heal |
| 2,576,981 | A | 12/1951 | Vogt |
| 3,218,005 | A | 11/1965 | Calderon |
| 3,845,918 | A | 11/1974 | White, Jr. |
| 4,017,041 | A | 4/1977 | Nelson |
| 4,172,574 | A | 10/1979 | Spillman |
| 4,190,219 | A | 2/1980 | Hackett |
| 4,205,810 | A | 6/1980 | Ishimitsu |
| 4,240,597 | A | 12/1980 | Ellis et al. |
| 4,245,804 | A | 1/1981 | Ishimitsu et al. |
| 4,247,062 | A | 1/1981 | Brueckner |
| 4,247,063 | A | 1/1981 | Jenkins |
| 4,272,043 | A | 6/1981 | Spillman |
| 4,365,773 | A | 12/1982 | Wolkovitch |
| 4,382,569 | A | 5/1983 | Boppe et al. |
| 4,455,004 | A | 6/1984 | Whitaker, Sr. |
| 4,457,479 | A | 7/1984 | Daude |
| 4,545,552 | A | 10/1985 | Welles |
| 4,591,113 | A | 5/1986 | Mabey |
| 4,671,473 | A | 6/1987 | Goodson |
| 4,674,709 | A | 6/1987 | Welles |
| 4,720,062 | A | 1/1988 | Warrink et al. |
| 4,722,499 | A | 2/1988 | Klug |
| 4,725,020 | A | 2/1988 | Whitener |
| 5,039,032 | A | 8/1991 | Rudolph |
| 5,072,894 | A | 12/1991 | Cichy |
| 5,100,081 | A | 3/1992 | Thomas |
| 5,156,358 | A | 10/1992 | Gerhardt |
| 5,348,253 | A | 9/1994 | Gratzer |
| 5,407,150 | A | 4/1995 | Sadleir |
| 5,899,409 | A | 5/1999 | Frediani |
| 5,988,563 | A | 11/1999 | Allen |
| 6,095,459 | A | 8/2000 | Codina |
| 6,161,801 | A | 12/2000 | Kelm et al. |
| 6,227,487 | B1 | 5/2001 | Clark |
| 6,297,486 | B1 | 10/2001 | Rom et al. |
| 6,345,790 | B1 | 2/2002 | Brix |
| 6,394,397 | B1 | 5/2002 | Ngo et al. |
| 6,422,518 | B1 | 7/2002 | Stuff et al. |
| 6,484,968 | B2 | 11/2002 | Felker |
| 6,666,666 | B1 | 12/2003 | Gilbert et al. |
| 6,766,981 | B2 | 7/2004 | Volk |
| 6,923,404 | B1 | 8/2005 | Liu et al. |
| 7,275,722 | B2 | 10/2007 | Irving et al. |
| 7,475,848 | B2 | 1/2009 | Morgenstern et al. |
| 7,744,038 | B2 | 6/2010 | Sankrithi et al. |
| 7,900,877 | B1 | 3/2011 | Guida |
| 7,922,115 | B2 | 4/2011 | Colgren et al. |
| 8,128,035 | B2 | 3/2012 | Malachowski et al. |
| 8,191,832 | B2 | 6/2012 | Berthereau et al. |
| 8,544,800 | B2 | 10/2013 | Stuhr |
| 8,651,431 | B1 | 2/2014 | White et al. |
| 8,684,315 | B2 | 4/2014 | Guida |
| 9,162,755 | B2 | 10/2015 | Guida |
| 9,469,391 | B1 | 10/2016 | Dong |
| 9,567,066 | B2 | 2/2017 | Guida |
| 9,764,825 | B2 | 9/2017 | Guida |
| 9,969,487 | B2 | 5/2018 | Guida |
| 10,486,797 | B2 | 11/2019 | Guida |
| 10,562,610 | B2 | 2/2020 | Guida |
| 10,562,613 | B2 | 2/2020 | Guida |
| 10,710,702 | B2 | 7/2020 | Davis |
| 11,111,006 | B2 | 9/2021 | Guida |
| 11,884,383 | B2 | 1/2024 | Guida |
| 11,897,601 | B2 * | 2/2024 | Page ........................ B64C 9/06 |
| 11,912,398 | B2 | 2/2024 | Guida |
| 12,017,753 | B2 | 6/2024 | Guida |
| 2004/0155157 | A1 | 8/2004 | Bray |
| 2006/0049307 | A1 | 3/2006 | Schweiger |
| 2007/0018049 | A1 | 1/2007 | Stuhr |
| 2007/0114327 | A1 | 5/2007 | Dees et al. |
| 2008/0308683 | A1 | 12/2008 | Sankrithi et al. |
| 2009/0200431 | A1 | 8/2009 | Konings et al. |
| 2009/0256029 | A1 | 10/2009 | Malachowski et al. |
| 2009/0266938 | A1 | 10/2009 | Berthereau et al. |
| 2009/0292405 | A1 | 11/2009 | Najmabadi et al. |
| 2010/0006706 | A1 | 1/2010 | Breitsamter et al. |
| 2010/0163669 | A1 | 7/2010 | Im |
| 2011/0127383 | A1 | 6/2011 | Guida |
| 2011/0186689 | A1 | 8/2011 | Guida |
| 2012/0187251 | A1 | 7/2012 | Guida |
| 2014/0306067 | A1 | 10/2014 | Guida |
| 2015/0008291 | A1 | 1/2015 | Guida |
| 2016/0009378 | A1 | 1/2016 | Guida |
| 2018/0029696 | A1 | 2/2018 | Guida |
| 2018/0043985 | A1 | 2/2018 | Thompson |
| 2019/0055008 | A1 | 2/2019 | Guida |
| 2020/0283130 | A1 | 9/2020 | Guida |
| 2020/0324878 | A1 | 10/2020 | Guida |
| 2021/0394889 | A1 | 12/2021 | Guida |
| 2023/0257108 | A1 * | 8/2023 | Page ...................... B64C 39/10 244/199.4 |
| 2024/0409204 | A1 * | 12/2024 | Guida .................. B64C 23/076 |
| 2025/0153843 | A1 | 5/2025 | Guida |

FOREIGN PATENT DOCUMENTS

| | | | |
|---|---|---|---|
| FR | 2540824 | A1 | 8/1984 |
| FR | 2636592 | | 3/1990 |
| JP | 01254491 | | 10/1989 |
| JP | H06502364 | | 3/1994 |
| JP | 8104296 | | 4/1996 |
| JP | 200950167 | | 1/2009 |
| JP | 201050357 | | 2/2010 |
| WO | WO2007018785 | | 2/2007 |
| WO | WO201106865 | | 6/2011 |
| WO | WO201315181 | | 10/2013 |

OTHER PUBLICATIONS

Bagg, et al., "Review of Literature Pertaining to Raked Tip and Other Wingtip Modifications," retrieved on Sep. 7, 2010 at <<https://www.engineering.purdue.edu/AAE/Academics/Courses/aae490t/teams2003/rakedtip/Review%20of%20Literature.doc>>, 5 pages.

Berens, "Potential of Multi-Winglet Systems to Improve Aircraft Performance," retrieved on Sep. 7, 2010 at <<http://deposit.d-nb.de/cgi-bin/dokserv?idn=990039978&dok_var=d1&dok_ext=pdf&filename=990039978.pdf>> 265 pages.

Boeing, "Aerodynamics of Winglets," retrieved on Sep. 7, 2010 at <<http://www.boeing.com/commercial/aeromagazine/aero_17/winglet_story.html>>, 9 pages.

European Office Action mailed Feb. 24, 2021 for European Patent Application No. 13773104.8, a counterpart foreign application of U.S. Pat. No. 9,162,755, 5 pages.

European Office Action mailed Jul. 22, 2022 for European Patent Application No. 13773104.8, a foreign counterpart to U.S. Pat. No. 9,162,755, 5 pages.

Japanese Office Action mailed Sep. 8, 2020 for Japanese Patent Application No. 2017-035382, a counterpart foreign application of U.S. Appl. No. 12/797,742, 5 pages.

Australian Office Action mailed Jan. 19, 2015 for Australian patent application No. 2013200686, a counterpart foreign application of U.S. Appl. No. 12/797,742, 3 pages.

Australian Office Action mailed Jun. 15, 2016 for Australian patent application No. 2013243818, a counterpart foreign application of U.S. Pat. No. 9,162,755, 2 pages.

European Office Action mailed Dec. 18, 2013 for European patent application No. 10821429.7, a counterpart foreign application of U.S. Appl. No. 12/890,557, 7 pages.

(56) References Cited

OTHER PUBLICATIONS

European Office Action mailed Jul. 19, 2019 for Euoprean patent application No. 13773104.8, a counterpart foreign application of U.S. Pat. No. 7,900,877, 5 pages.
European Office Action mailed Jun. 6, 2017 for European patent application No. 13773104.8, a counterpart foreign application of U.S. Pat. No. 9,162,755, 4 pages.
Extended European Search Report mailed Nov. 30, 2012 for European patent application No. 10821429.7, pages.
Extended European Search Report mailed Nov. 6, 2015 for European patent application No. 13773104.8, 6 pages.
Japanese Office Action mailed on May 29, 2020 for Japanese Patent Application No. 2017-035382, a counterpart of U.S. Appl. No. 12/797,742, 2 pages.
Japanese Office Action mailed on Nov. 19, 2019 for Japanese Patent Application No. 2017-035382, a counterpart of U.S. Appl. No. 12/797,742, 6 pages.
PCT Search Report and Written Opinion mailed Aug. 19, 2013 for PCT application No. PCT/US13/33577 15 pages.
PCT Search Report mailed Aug. 19, 2011 for PCT application No. PCT/US10/56586, 10 pages.
Final Office Action dated Jul. 6, 2020 for U.S. Appl. No. 15/979,331 "Multiple Controlloable Airflow Modification Devices" Guida, 7 pages.
Final Office Action dtd Feb. 27, 2019 for U.S. Appl. No. 15/707,991 "Active Winglet" Guida, 7 pages.
Final Office Action for U.S. Appl. No. 13/075,934, mailed May 1, 2012, Nicholas R. Guida, "Active Winglet", 5 pages.
Final Office Action for U.S. Appl. No. 13/438,614, mailed on Nov. 26, 2014, Nicholas R. Guida, "Multiple Controllable Airflow Modification Devices", 5 pages.
Final Office Action for U.S. Appl. No. 14/887,139, mailed on Jun. 6, 2017, Nicholas R. Guida, "Multiple Controllable Airflow Modification Devices", 7 pages.
Fluent, Inc., "Winglet Designed with Computer Simulation Cuts Airliner's Fuel Consumption," JA1333, Copyright 2002, retrieved at <<http://www.fluent.com/solutions/articles/ja133.pdf>>. 5 pages.
Guida, U.S. Appl. No. 12/797,742 entitled "Active Winglet" filed Jun. 10, 2010.
Hale, "Investigation into the Application of Winglets on Canards for Tip Vortex Position Improvement," retrieved on Sep. 7, 2010 from <<http://seit.unsw.adfa.edu.au/ojs/index.php/juer/article/viewFile/250/152>>. 9 pages.
NASA, Dryden Flight Research Center—Winglets, retrieved on Sep. 7, 2010 from <<http://www.nasa.gov/centers/dryden/about/Organizations/Technology/Facts/TF-2004-15-DFRC.html>>, 3 pages.
Non Final Office Action dated Feb. 20, 2020 for U.S. Appl. No. 15/979,331 "Multiple Controlloable Airflow Modification Devices" Guida, 8 pages.
Non-Final Office Action for U.S. Appl. No. 13/075,934, mailed Dec. 6, 2011, Nicholas R. Guida, "Active Winglet", 13 pages.
Office action for U.S. Appl. No. 13/075,934, mailed on Sep. 6, 2013, Guida, "Active Winglet ", 5 pages.
Office Action for U.S. Appl. No. 13/438,614, mailed on May 28, 2014, Nicholas R. Guida, "Multiple Controllable Airflow Modification Devices", 11 pages.
Office action for U.S. Appl. No. 14/222,437, mailed on Apr. 1, 2016, Guida, "Active Winglet", 13 pages.
Office action for U.S. Appl. No. 14/222,437, mailed on Oct. 19, 2016, Guida, "Active Winglet", 6 pages.
Office action for U.S. Appl. No. 14/887,139, mailed on Aug. 30, 2016, Guida, "Multiple Controllable Airflow Modification Devices", 10 pages.
Office action for U.S. Appl. No. 15/707,991, mailed on Jul. 19, 2018, Guida, "Active Winglet ", 12 pages.
Office Action for U.S. Appl. No. 16/694,875, mailed on Feb. 9, 2022, Guida, "Active Winglet ", 6 Pages.
Office Action for U.S. Appl. No. 16/694,875, mailed on Mar. 27, 2023, Guida, "Active Winglet ", 7 Pages.
Office Action for U.S. Appl. No. 16/694,875, mailed on Jul. 9, 2021, Guida, "Active Winglet ", 12 pages.
Office Action for U.S. Appl. No. 16/694,875, mailed on Sep. 7, 2022, Guida, "Active Winglet ", 6 pages.
Office Action for U.S. Appl. No. 17/467,125, mailed on Apr. 11, 2023, Nicholas Guida, "Multiple Controllable Airflow Modification Devices", 6 pages.
Shelton, et al., "Active Multiple Winglets for Improved Unmanned-Aerial-Vehicle Performance," Jouranl of Aircraft, vol. 43, No. 1, Jan.-Feb. 2006, pp. 110-116.
Translated Japanese Office Action mailed Aug. 29, 2017 for Japanese Patent Application No. 2015-504613, a counterpart foreign application of U.S. Pat. No. 9,162,755, 4 pages.
Translated Japanese Office Action mailed Dec. 22, 2015 for Japanese patent application No. 2014-096151, a counterpart foreign application of U.S. Appl. No. 12/797,742, 5 pages.
Translated Japanese Office Action mailed Feb. 20, 2018 for Japanse patent application No. 2017-035382, a counterpart foreign application of U.S. Pat. No. 7,900,877, 6 pages.
Translated Japanese Office Action mailed Feb. 7, 2017 for Japanese patent application No. 2015-504613, a counterpart foreign application of U.S. Pat. No. 9,162,755, 11 pages.
Translated Japanese Office Action mailed Jan. 29, 2019 for Japanse patent application No. 2017-035382, a counterpart foreign application of U.S. Pat. No. 7,900,877, 9 pages.
Translated Japanese Office Action mailed Mar. 31, 2015 for Japanese patent application No. 2014-096151, a counterpart foreign application of U.S. Pat. No. 7,900,877, 6 pages.
Translated Japanese Office Action mailed Oct. 25, 2016 for Japanese patent application No. 2014-066151, a counterpart foreign application of U.S. Pat. No. 7,900,877, 5 pages.
Office Action for U.S. Appl. No. 18/421,610, Dated Sep. 11, 2025,Guida, Active Winglet, 12 pages.

* cited by examiner

Fig. 11A
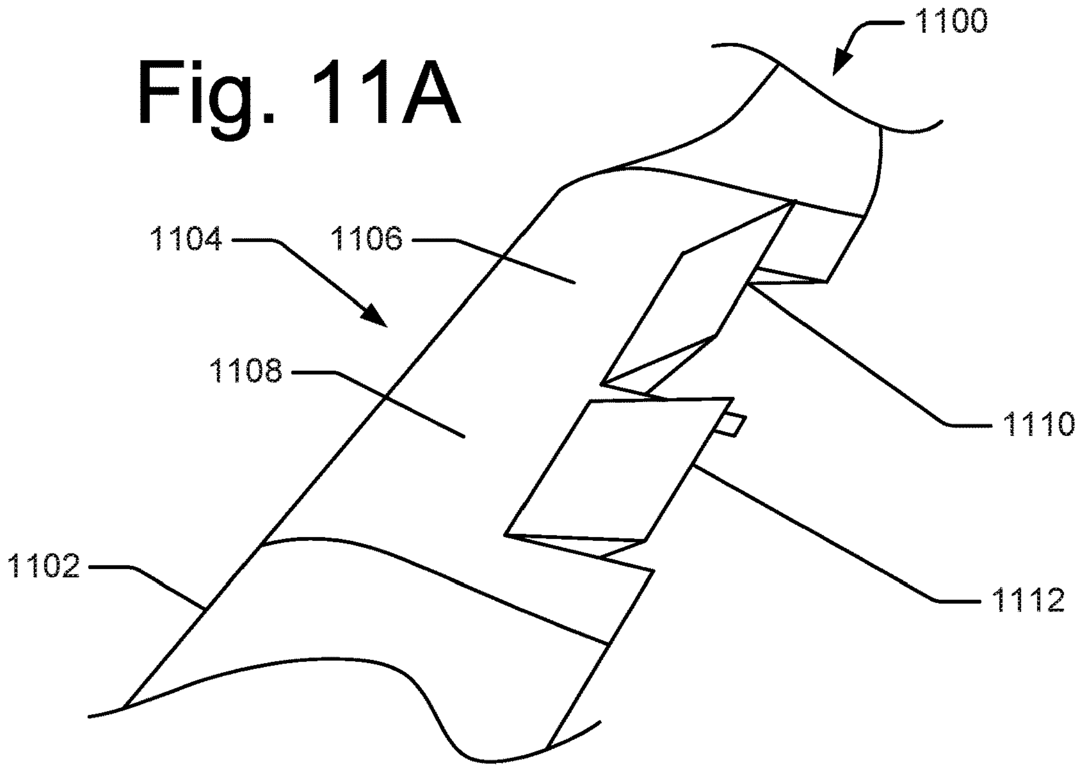
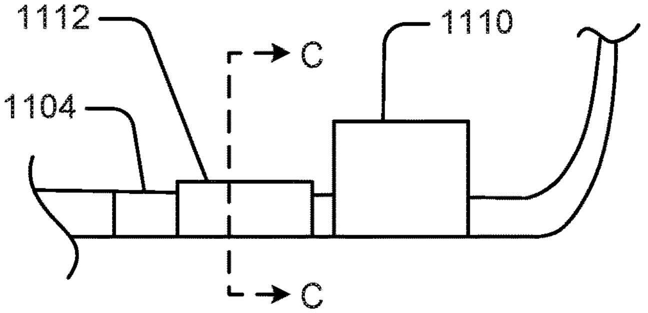
Fig. 11B
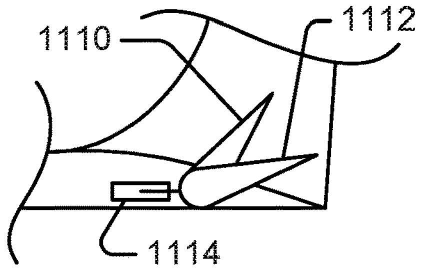
Fig. 11C
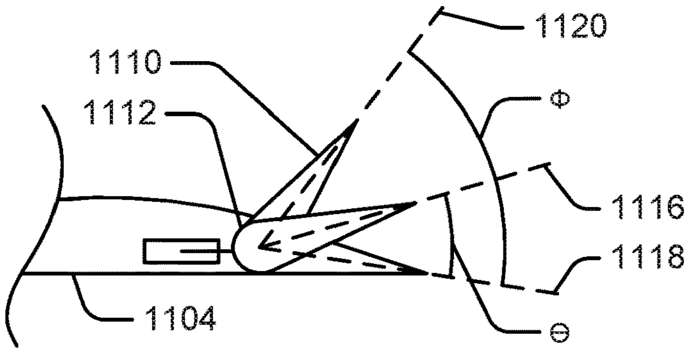
Fig. 11D

MULTIPLE CONTROLLABLE AIRFLOW MODIFICATION DEVICES

RELATED APPLICATION

This application is a continuation of and claims priority to U.S. patent application Ser. No. 17/467,125, filed Sep. 3, 2021, which is a continuation of and claims priority to U.S. patent application Ser. No. 15/979,331, filed May 14, 2018, now U.S. Pat. No. 11,111,006, issued Sep. 7, 2021, which is a continuation of and claims priority to U.S. patent application Ser. No. 14/887,139, filed Oct. 19, 2015, now U.S. Pat. No. 9,969,487, issued May 15, 2018, which is a continuation of and claims priority to U.S. patent application Ser. No. 13/438,614, filed Apr. 3, 2012, now U.S. Pat. No. 9,162,755, issued Oct. 20, 2015, which is a continuation-in-part of and claims priority to U.S. patent application Ser. No. 13/075,934, filed Mar. 30, 2011, now U.S. Pat. No. 8,684,315, issued Apr. 1, 2014, which is a continuation of and claims priority to U.S. patent application Ser. No. 12/797,742, filed Jun. 10, 2010 (now abandoned), which claims the benefit of U.S. Provisional Patent Application No. 61/265,534, filed Dec. 1, 2009, all of which are incorporated herein by reference.

BACKGROUND

There exists an ever growing need in the aviation industry to increase aircraft efficiencies and reduce the amount of fossil fuels consumed. Winglets have been designed and installed on many aircraft including large multi-passenger aircraft to increase efficiency, performance, and aesthetics. Such winglets usually consist of a horizontal body portion that may attach to the end of a wing and an angled portion that may extend vertically upward from the horizontal body portion. For example, a winglet may be attached to a pre-existing wing of an aircraft to increase flight efficiency, aircraft performance, or even to improve the aesthetics of the aircraft. Similarly, simple wing extensions have been used to address similar goals.

However, the cost to install a winglet or a wing extension on an aircraft is often prohibitive due to the requirement to reengineer and certify the wing after the winglet or extension is installed. Thus, aftermarket installation of winglets and wing extensions has generally been reserved for large aircraft owned and operated by large aircraft companies.

Existing winglets and wing extensions have limited utility, in that each winglet and wing extension must be designed and certified for a specific wing of a specific aircraft model. Moreover, addition of a winglet or wing extension to an aircraft typically increases the loads on the wing, thereby decreasing the usable life of the wing and/or requiring addition of substantial structural reinforcement to the wing. The weight of this structural reinforcement detracts from any efficiencies gained by addition of the winglet in the first place. Additionally, existing winglets and wing extensions, which are fixed, are unable to adapt to changes in in-flight conditions. Accordingly, there remains a need in the art for improved aircraft winglets and wing extensions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure describes active airflow modification systems that may use multiple controllable airflow modification devices. For example, an aircraft may comprise a fuselage with a baseline wing coupled an active wing extension. The active wing extension may comprise a plurality of controllable airflow modification devices (CAMDs). A CAMD may comprise a control surface and a control system for controlling the motion of the control surface based at least in part on in-flight and/or historical load data. The control system may be configured to control multiple CAMDs independently or in coordination with each other.

Various embodiments provide for a wing extension that is fixedly attachable to a baseline wing of an aircraft. Here the wing extension may comprise a plurality of CAMDs. A CAMD may be coupled to a control system for controlling a control surface of the CAMD. In various embodiments, the control system may be configured to control a plurality of CAMDs independently of an auto-pilot and/or a fly-by-wire system of the aircraft. The control system may comprise a control device with control logic. The control device may be communicatively coupled to a sensor located on the aircraft to receive a signal to indicate flight conditions of the aircraft. The control device may be configured to adjust the CAMD at least partly based on the signal from the sensor located on the aircraft.

Various embodiments provide for use of an active airflow modification system including a plurality of CAMDs. For example, the system may receive flight condition data from a sensor located on an aircraft. The system may adjust a plurality of CAMDs located on a wing extension of the aircraft based at least in part on the received flight condition data. The CAMDs may be adjusted by, for example, rotating a control surface to reduce a wing load of a wing of the aircraft by moving a center of pressure of the wing, the center of pressure due to and associated with aerodynamic forces acting on the wing, inboard and/or reduce an impact of a wing extension on a fatigue life of a wing of the aircraft. The CAMDs may be adjusted independently of each other or in coordination with one another.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

FIGS. 11A-D depict an illustrative wing extension with a vertically extending wingtip device, a view from a trailing edge of the wing extension with a wingtip device depicted in FIG. 11A, and a cross-sectional view of the wing extension with a wingtip device taken along line C-C of FIG. 11B.

DETAILED DESCRIPTION

Overview

Figure 1:
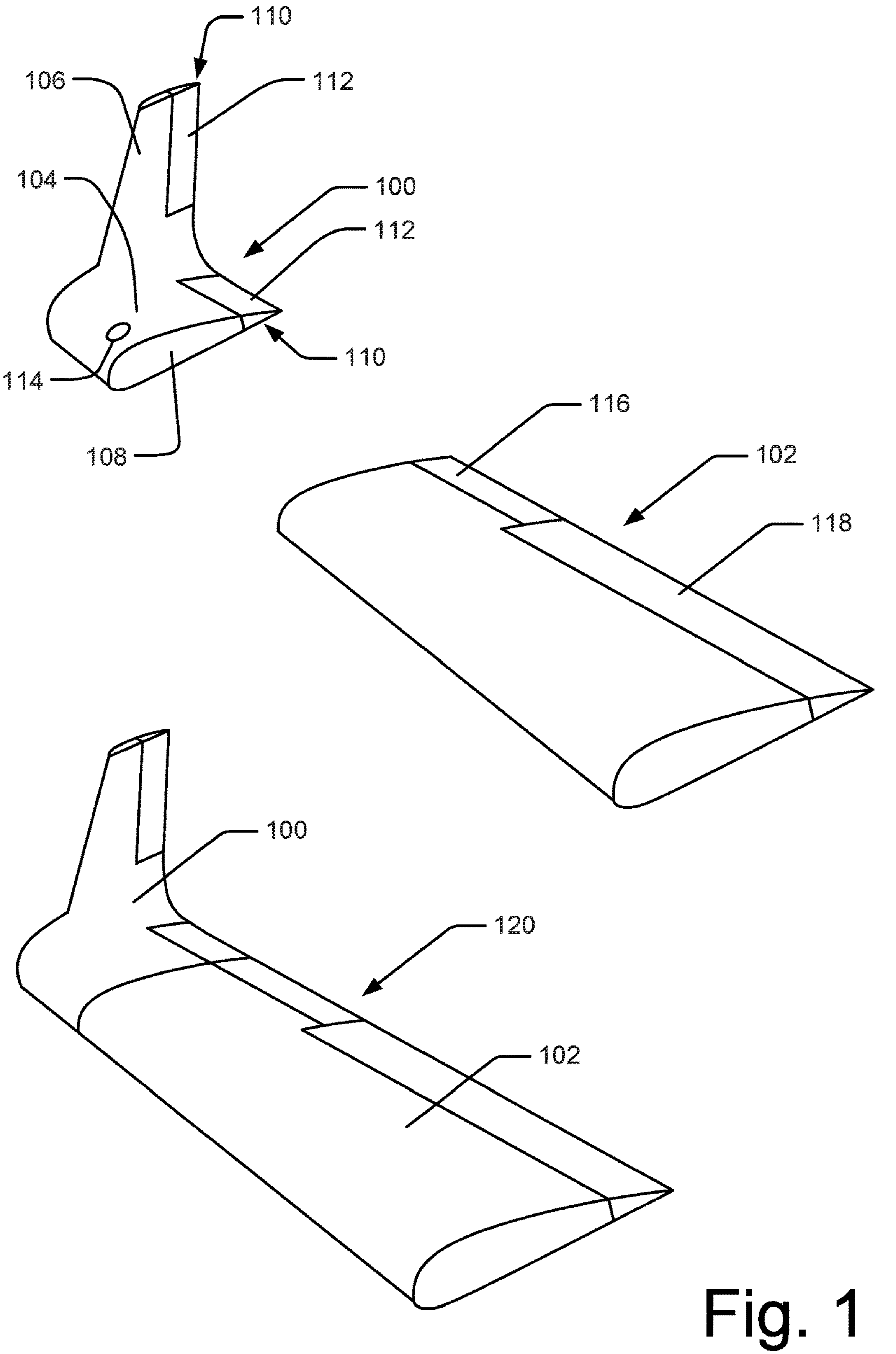
FIG. 1 depicts an illustrative wing extension with a vertically extending wingtip device attachable to a wing of an aircraft.

This application describes controllable airflow modification devices (CAMDs) that may be used in active wing extensions for improving the efficiency, performance, and/or aesthetics of an aircraft. The CAMDs according to this application may also reduce fatigue of the wings of the aircraft, extend a usable life of the wings of the aircraft, and/or decrease a certification cost and time associated with adding wing extensions to the aircraft. Wing extensions may also include wingtip devices that may further improve efficiency, performance, and aesthetics of an aircraft. By virtue of having CAMDs, such active wing extensions may be able to adjust edges and/or portions of the control surfaces of a CAMD in response to flight condition data.

As discussed above, adding wing extensions to an existing wing improves airplane efficiency and performance by increasing lift and reducing drag. This performance benefit may come at the cost of adding additional stress to the wing that was not accounted for by the original airplane manufacturer. As a result, installing traditional passive wing extensions or winglets on airplanes is expensive because the wing may need to be fully analyzed, reverse engineered, and tested to determine if the wing has the structural ability to accommodate the addition of winglets. In most cases, when installing conventional winglets or wing extensions, structural wing modifications are required. Additionally, the useful life (fatigue life) of the wing is reduced by addition of winglets or wing extensions, thereby increasing the total cost of airplane ownership to the customer.

In contrast, the active wing extensions described herein reduce the engineering and certification costs associated with addition of wing extensions because the active extensions have a minimal (potentially even beneficial) structural effect while maintaining a positive aerodynamic effect. In other words, the active wing extensions described herein improve airplane efficiency and performance by increasing lift and reducing drag, without the drawbacks (e.g., added stress and fatigue and/or reengineering of the wing) associated with conventional fixed winglets and wing extensions. As previously noted, an active wing extension according to this disclosure may have an airflow control system in the form of one or more CAMDs located on the wing extension. A CAMD located on the wing extension may be adjusted, which may change the aerodynamic forces on the aircraft wing (e.g., to mitigate or offset stresses on the wing during gusts, maneuvers, and/or turbulent air).

The active wing extension on an aircraft may be designed to keep spanwise section loads at or below originally designed values for a given wing without a wing extension. Thus, the active wing extension may eliminate the requirement to have a wing reinforced due to the addition of the wing extension. Additionally, the CAMD of the active wing extension may be configured to reduce the bending moment of the wing by moving the center of pressure of the wing inboard and/or reduce the impact of the wing extension on the fatigue life of the wing. Therefore, the addition of the active wing extension may not significantly decrease, if at all, the service life of the wing and/or the aircraft to which it is attached. In some instances, addition of an active wing extension may even reduce fatigue and increase an overall service life of the wing and/or the aircraft to which it is attached. Additionally, in the same or other instances, addition of an active wing extension may also increase the overall capacity of the wing carrying capability of the aircraft, thus increasing the aircraft's gross weight potential.

As discussed above, this disclosure describes active airflow modification systems that may use multiple controllable airflow modification devices. For example, an aircraft may comprise a fuselage with a baseline wing coupled to the fuselage at a first end of the baseline wing. The baseline wing may also have control surfaces, including for example, an aileron. The aircraft may also comprise a wing extension. The wing extension may comprise a horizontal portion coupled to the baseline wing at a second end such that the horizontal portion is outboard of the baseline wing. The horizontal portion may be substantially coplanar with the baseline wing, meaning, for example, that if the baseline wing has a dihedral or anhedral configuration, the horizontal portion may continue outwardly from the baseline wing at the same angle continuing the dihedral or anhedral configuration. Additionally or alternatively, the horizontal portion may be set at an angle with respect to the baseline wing, for example, providing dihedral or anhedral at the wing extension with respect to the baseline wing. The wing extension may also comprise a plurality of controllable airflow modification devices (CAMDs) directly coupled to the horizontal portion of the wing extension. The horizontal portion may also comprise a first horizontal segment and a second horizontal segment where the first horizontal segment is disposed between the baseline wing and the second horizontal segment. Here, the first horizontal segment may be directly coupled to a first CAMD of the plurality of CAMDs, and the second horizontal segment may be directly coupled to a second CAMD of the plurality of CAMDs. Stated another way, the first horizontal segment containing the first CAMD may be located outboard of the baseline wing and inboard of the second horizontal segment containing the second CAMD.

A CAMD may comprise a control surface disposed at a trailing edge of the baseline wing, such that the control surface is substantially parallel to the baseline wing. The CAMD may also comprise a control system for controlling motion of the control surface based at least in part on in-flight load data. The control surface may be configured for the aircraft based at least in part on historical flight data. The control system may be communicatively coupled to a sensor located on the aircraft and configured to receive a signal from the sensor. Further, the control system may be configured to control the control surface of the CAMD independent of a control surface of another CAMD. Additionally or alternatively, the control system may be configured to control the control surface of the first CAMD synchronous with the second CAMD.

Various embodiments provide for a wing extension that is fixedly attachable to a baseline wing of an aircraft. Here the wing extension may comprise a horizontal portion that is substantially parallel to the baseline wing of the aircraft where the horizontal portion may be configured to fixedly attach to an outboard portion of the baseline wing of the aircraft. The wing extension may also comprise a plurality of CAMDs coupled to the horizontal portion of the wing extension. The wing extension may further comprise a wingtip device that may be directly coupled to an outboard portion of the horizontal portion. In some embodiments, the wingtip device may also include a vertically extending portion. The vertically extending portion extends at least somewhat in the vertical direction, but need not be perpendicular to the horizontal portion or to the horizon. In other words, the vertically extending portion extends from the horizontal portion at an angle including a vertical component.

A CAMD may be coupled to a control system for controlling a control surface of the CAMD. In various embodiments, the control system may be configured to control a CAMD independently of an auto-pilot and/or a fly-by-wire system of the aircraft. The control system may comprise a control device with control logic where the control device may be configured to communicatively couple to a sensor located on the aircraft. The control device may be configured, when coupled to the sensor, to receive a signal from the sensor located on the aircraft to flight conditions of the aircraft. The control device being further configured to adjust the CAMD at least partly based on the signal from the sensor located on the aircraft.

Various embodiments provide for use of an active airflow modification system. For example, the system may receive flight condition data from a sensor located on an aircraft. The system may adjust a plurality of CAMDs located on a wing extension of the aircraft based at least in part on the received flight condition data. In some embodiments, the plurality of CAMDs may be located on a horizontal portion of the wing extension that may be substantially parallel to a baseline wing of the aircraft. The CAMDs may be adjusted by rotating a control surface at a hinge along a horizontal axis such that an edge of the control surface other than the one edge coupled to the hinge moves up or down in relation to the horizontal portion of the wing extension. The adjustment of the CAMDs may be configured to reduce a wing load of a wing of the aircraft by moving a center of pressure of the wing inboard and/or reduce an impact of a wing extension on a fatigue life of a wing of the aircraft. Here, for example, the wing load may comprise a bending moment and/or a torsional moment of the wing.

The CAMDs may be adjusted independently of each other or in coordination with one another. For example, a first CAMD may be adjusted independent of a second CAMD. Additionally or alternatively, a first CAMD may be adjusted in coordination with a second CAMD. For example, a first CAMD may be adjusted by providing a first control response, and a second CAMD may be adjusted by providing a second control response. Various embodiments provide for a magnitude of the second control response to be greater than a magnitude of the first control response. Various embodiments provide for a timing of the first control response to be later than a timing of the second control response. Various embodiments provide for the first and second CAMDs being present in the same wing extension.

Illustrative Active Wing Extensions

FIG. 1 depicts an illustrative active wing extension 100 which is attachable to a wing 102 of an aircraft (not shown). In one embodiment, the active wing extension 100 may include a body portion 104 which may be substantially parallel to a horizontal plane and/or a wing of an aircraft. By way of example only, and not limitation, the active wing extension 100 may also include a wingtip device, for example, an angled portion 106 on the outer side of the body portion 104 and an attachable portion 108 on the inner side of the body portion 104. In this example, the outer and inner sides of the body portion 104 are described with relation to the wing 102 such that the outer side is further from the wing 102 than the inner side. Additionally, the angled portion 106 may be substantially vertical in relation to the body portion 104 such that it projects perpendicularly from the body portion 104. However, in other embodiments, the angled portion 106 may be configured to project from the body portion 104 at angles other than 90 degrees. In yet other embodiments, the angled portion 106 may be configured to project from the body portion 104 at angles which include projecting downward (in relation to the aircraft). Additionally, although the angled portion 106 is described above as projecting from the outer side of the body portion 104, the active wing extension 100 may be designed such that the angled portion 106 may project from the middle, or any other location, of the body portion 104 (i.e., the angled portion 106 may be located at any location between the inner and outer sides of the body portion 104). Further, although the angled portion 106 is illustrated in FIG. 1 as projecting from the outer side of the body portion 104 in a blended configuration with a substantially smooth transition from the body portion 104 to the angled portion 106, the transition between the body portion 104 and the angled portion 106 need not be blended and/or smooth.

The active wing extension 100 may include a controllable airflow modification device (CAMD) 110 in the form of one or more control surfaces 112 located on the body portion 104 and/or the angled portion 106. By further way of example, in one embodiment, the CAMD 110 may be located on the body portion 104 of the active wing extension 100. In another embodiment, the CAMD 110 may be located on the angled portion 106 of the active wing extension 100. In yet another embodiment, the CAMD 110 may be located on both the body portion 104 and the angled portion 106 of the active wing extension 100. Further, and by way of example only, in the embodiment shown in FIG. 1, the CAMD 110 is shown located on the aft of the active wing extension 100 (i.e., the back-side or trailing edge of the active wing extension 100 in relation to the front of an aircraft). In this way, adjustment of the CAMD 110 may change the angle of the control surface 112 in relation to the aft portion (body portion 104 or angled portion 106) of the active wing extension 100 on which the control surface 112 is located. Additionally, as shown in FIG. 1, the active wing extension 100 may include two CAMDs 110. However, in other embodiments, more or fewer CAMDs 110 may be used depending on a variety of factors, such as the size of the aircraft and desired performance characteristics.

Further, as shown in FIG. 1 by way of example only, the angled portion 106 is shown as a basic trapezoidal shape. However the angled portion 106 may be rectangular, triangular, oval, or any other geometric shape. Additionally, the airflow control surface 112 located on the angled portion 106, may be similar in shape to, or the same shape as, the airflow control surface 112 located on the body portion 104 of the active wing extension 100.

Additionally, the active wing extension 100 in FIG. 1 illustrates, by way of example and not limitation, a sensor 114 located in the body portion 104 on the active wing extension 100. However, the sensor 114 may be disposed at other locations of the active wing extension 100 or of the aircraft. For example, one or more sensors may be located on the angled portion 106, on the front or leading edge of the body portion 104 (in relation to the aircraft), on the aft of the body portion 104 (in relation to the aircraft), on the surface of the wing extension 100, inside the wing extension 100 (i.e., located within the surface of the wing extension 100), anywhere within the aircraft, including, for example, the baseline wing, the fuselage, the tail, or the like.

Also depicted in FIG. 1, by way of example only, is an illustrative wing 102 of an aircraft (not shown) prior to the attachment of an active wing extension 100 as described above. The wing 102 may include an aileron 116 and a flap 118. The aileron 116 and the flap 118 may be used for flight control of the aircraft and in some instances may be controlled by one or more pilots of the aircraft. The wing 102 may be described as a baseline wing of an aircraft (not shown). The baseline wing may or may not include wingtips and/or wingtip devices that may be replaced by a wing extension 100 or extended outwardly by a wing extension 100.

FIG. 1 also depicts an illustrative modified wing 120 which may include the illustrative wing 102 coupled to the active wing extension 100. The modified wing 120 may be designed and crafted for a new aircraft (e.g., with an active wing extension integrated into the aircraft during its original manufacture), or the active wing extension 100 may be attached to the existing wing 102 after the fact. The active wing extension 100 of modified wing 120 may be configured in a similar shape as the existing wing 102. Additionally, and by way of example only, the wing extension 100 may fit over a portion of the existing wing 102 such that a portion of the end of the existing wing 102 resides within the attachable portion 108 of the active wing extension 100. In that case, the attachable portion 108 may include a sleeve or collar that fits over at least a portion of the end of the existing wing 102. In other embodiments, the active wing extension 100 may additionally or alternatively be attached to the existing wing 102 by fastening the end of the existing wing 102 to the attachable portion 108 via an abutting face and/or via an internal structural support. Further, the wing extension 100 may be fabricated of the same or similar material as the existing wing 102.

Figure 2:
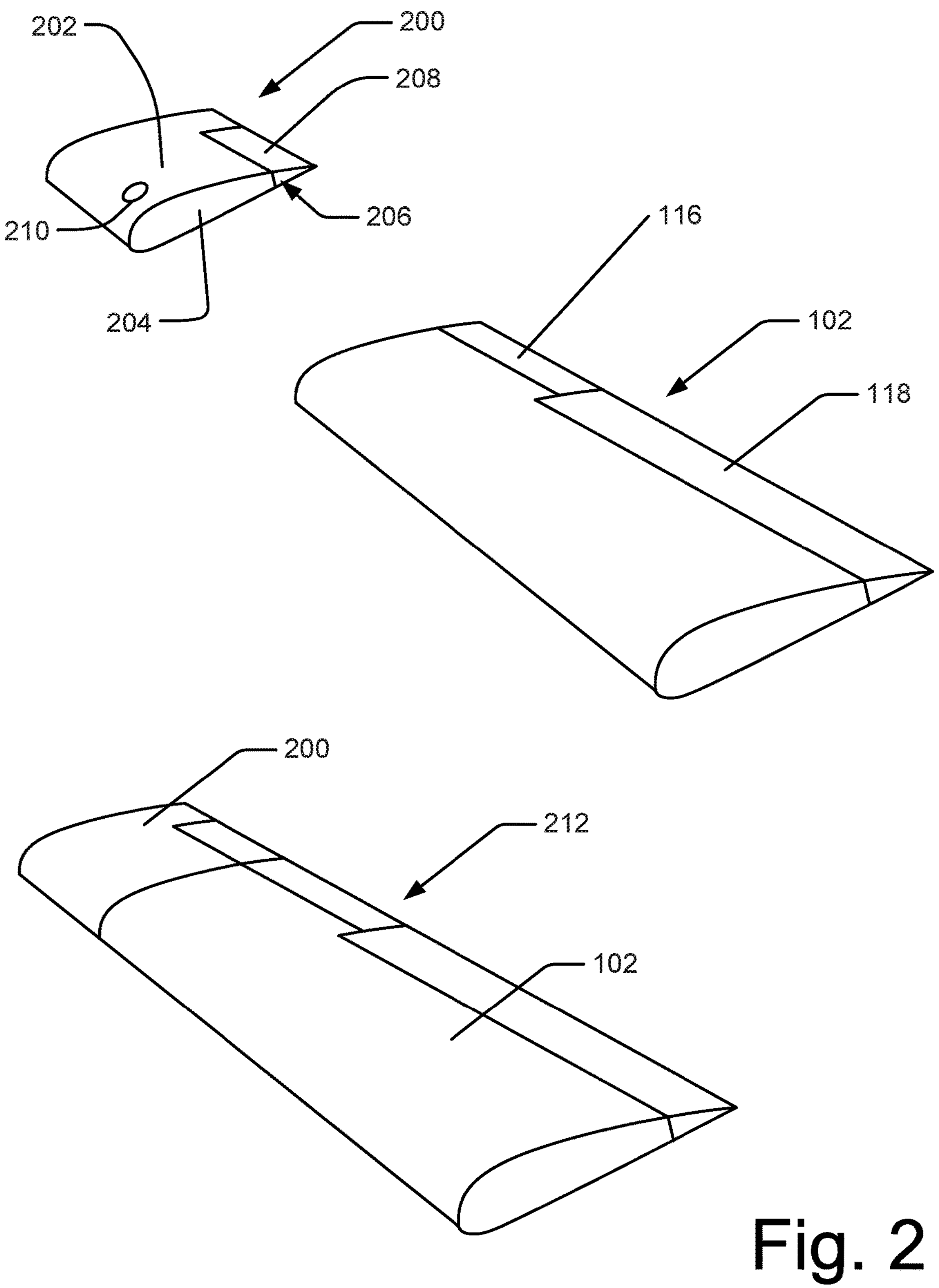
FIG. 2 depicts another illustrative wing extension attachable to a wing of an aircraft.

FIG. 2 depicts an illustrative active wing extension 200 which may be attachable to a wing 102 of an aircraft. In one embodiment, the active wing extension 200 may include a body portion 202 which may be substantially parallel to a horizontal plane and/or a wing of the aircraft. By way of example only, and not limitation, the active wing extension 200 may also include a wingtip device (not shown) and an attachable portion 204 on the inner side of the body portion 202. In this example, the outer and inner sides of the body portion 202 are described with relation to the wing 102 such that the outer side is further from the wing 102 than the inner side.

The active wing extension 200 may include a CAMD 206 in the form of one or more control surfaces 208 located on the body portion 202. By way of example only, in the embodiment shown in FIG. 2, the CAMD 206 is shown located on the aft of the active wing extension 200 (i.e., the back-side or trailing edge of the active wing extension 200 in relation to the front of an aircraft). In this way, adjustment of the CAMD 206 may change the angle of the control surface 208 in relation to the aft portion (body portion 202) of the active wing extension 200. Additionally, as discussed below, the active wing extension 200 may include two or more CAMDs 206. However, in other embodiments, more or fewer CAMDs 206 may be used depending on a variety of factors, such as the size of the aircraft and desired performance characteristics.

Additionally, the active wing extension 200 in FIG. 2 illustrates, by way of example and not limitation, a sensor 210 located in the body portion 202 on the active wing extension 200. However, the sensor 210 may disposed at other locations of the active wing extension 200 or of the aircraft. For example, one or more sensors may be located on the front or leading edge of the body portion 202 (in relation to the aircraft), on the aft of the body portion 202 (in relation to the aircraft), on the surface of the wing extension 200, inside the wing extension 200 (i.e., located within the surface of the wing extension 200), anywhere within the aircraft, including, for example, the baseline wing, the fuselage, the tail, or the like.

Also depicted in FIG. 2, by way of example only, is an illustrative wing 102 of an aircraft (not shown) prior to the attachment of an active wing extension 200 as described above. The wing 102 may include an aileron 116 and a flap 118. The aileron 116 and the flap 118 may be used for flight control of the aircraft and in some instances may be controlled by one or more pilots of the aircraft. The wing 102 may be described as a baseline wing of an aircraft (not shown). The baseline wing may or may not include wingtips and/or wingtip devices that may be replaced by a wing extension 200 or extended outwardly by a wing extension 200. Additionally, the wing extension 200 may be configured to couple to the structure of the baseline wing, for example, the wing extension 200 may have one or more spar extensions (not shown) that couple to one or more spars in the baseline wing.

FIG. 2 also depicts an illustrative modified wing 212 which may include the illustrative wing 102 coupled to the active wing extension 200. The modified wing 212 may be designed and crafted for a new aircraft (e.g., with an active wing extension integrated into the aircraft during its original manufacture), or the active wing extension 200 may be attached to the existing wing 102 after the fact. The active wing extension 200 of modified wing 212 may be configured in a similar shape as the existing wing 102. Additionally, and by way of example only, the wing extension 200 may fit over a portion of the existing wing 102 such that a portion of the end of the existing wing 102 resides within the attachable portion 204 of the active wing extension 200. In that case, the attachable portion 204 may include a sleeve or collar that fits over at least a portion of the end of the existing wing 102. In other embodiments, the active wing extension 200 may additionally or alternatively be attached to the existing wing 102 by fastening the end of the existing wing 102 to the attachable portion 204 via an abutting face and/or via an internal structural support. Further, the wing extension 200 may be fabricated of the same or similar material as the existing wing 102.

Illustrative Aircraft with Active Wing Extension

Figure 3:
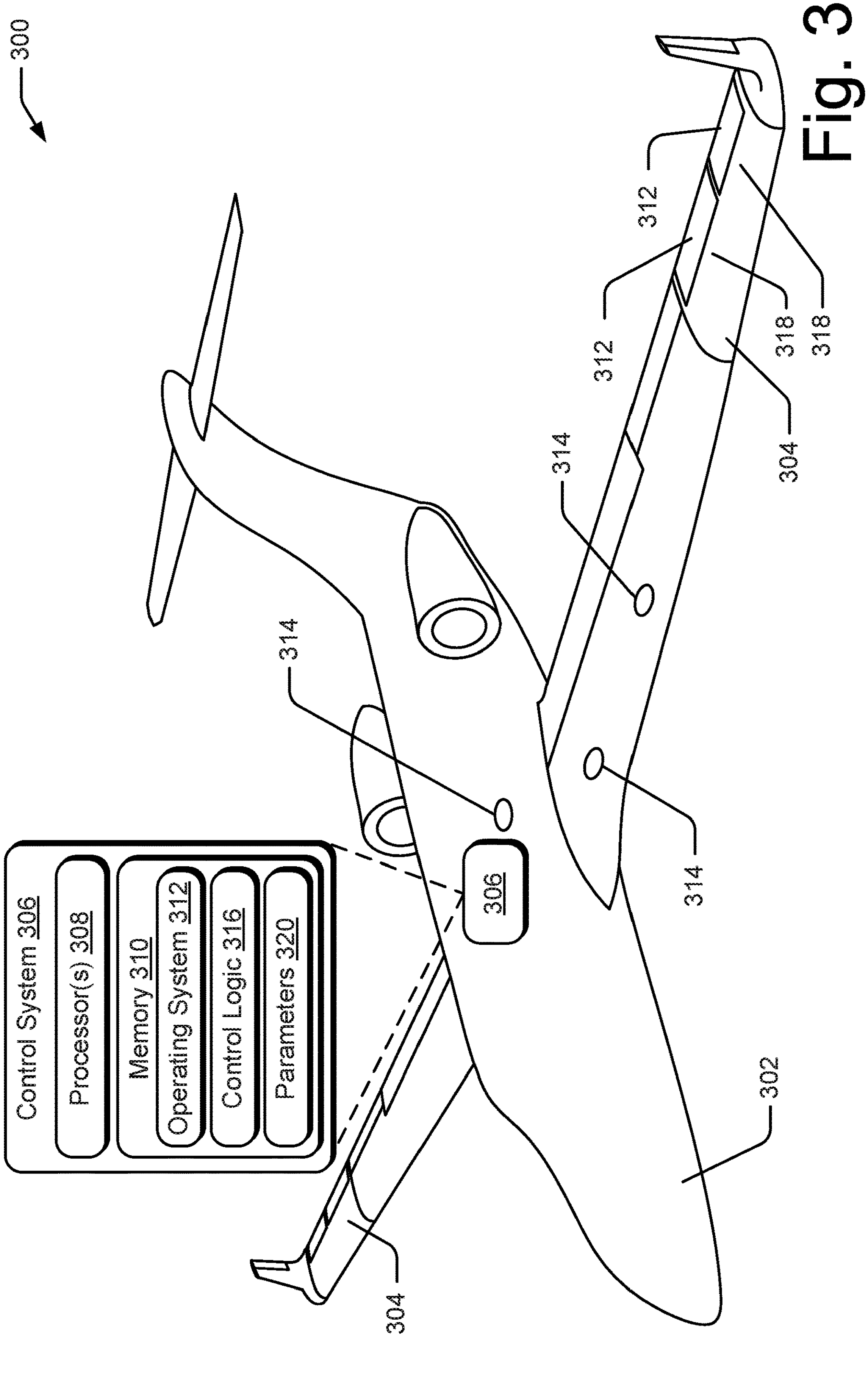
FIG. 3 depicts an aircraft with attached illustrative wing extensions, each wing extension having multiple airflow modification devices.

FIG. 3 depicts an illustrative load alleviation system 300 implemented on an aircraft 302 that includes at least one attached active wing extension 304. The components of the load alleviation system 300 may include sensors 314, active wing extension(s) 304, a control system 306, CAMD(s) 318, and control surface(s) 312. By way of example only, and not limitation, FIG. 3 illustrates an active wing extension 304 on each wing of the aircraft 302. However, active wing extensions 304 may also be placed on other surfaces of the aircraft 302. For example, the active wing extensions 304 may be located on the wings, as shown, or they may be located on the tail wings, or any other horizontal or vertical surface of the aircraft 302 including the fuselage.

As mentioned above, the load alleviation system 300 may comprise a control system 306. The control system 306 may be configured to control the active wing extensions 304 of the aircraft 302. By way of example only, and not limitation, the control system 306 may include one or more processor(s) 308 for receiving and processing system data, including, but not limited to, flight condition data. In one embodiment, the processor(s) 308 may receive in-flight data from the sensors 314. As mentioned above with respect to FIG. 1 and sensors 114, sensors 314 may be located anywhere on the aircraft including the wing, fuselage, wing extensions, and/or wingtip devices. The control system 306 may additionally consist of memory 310 for the storage of flight condition data. The data stored in the memory 310 may include previously received flight condition data, currently recorded (i.e., current in-flight) flight condition data, or a compilation of current in-flight data and/or previously recorded in-flight data. By way of example only, the memory 310 of the control system 306 may include an operating system 312 and control logic 316.

The operating system 312 may be responsible for operating the control system 306 by way of interfacing the data with the processor(s) 308 and providing a user interface (not shown) for interaction with one or more pilots of the aircraft 302. Additionally or alternatively, the operating system 312 may be responsible for operating the control system 306 by way of interfacing the data with the processor(s) 308 without providing a user interface and may be effectively invisible to a user, for example, a pilot. The control logic 316 of the control system 306 may be configured to operate the control surface(s) 312 of the CAMD(s) 318 of the active wing extension 304. In one embodiment, the control logic 316 may control the control surface(s) 312 based on flight condition data received from the sensor(s) 314. Additionally, parameters 320 may be stored in the memory 310. The parameters may be predetermined parameters and may be used by the control logic 316 to determine operation of the control surface(s) 312. In some embodiments, the control system 306 may operate the control surfaces 312 simultaneously or independently. By way of example only, the control system 306 of FIG. 3 is illustrated in the fuselage and/or hull of the aircraft 302. However, the control system 306 can be located anywhere on the aircraft, including, but not limited to, the cockpit, the tail, the wing, the wing extension, wingtip devices, or the like.

As mentioned above, the load alleviation system 300 may comprise active wing extension(s) 304, which include CAMD(s) 318 and control surface(s) 312. In various embodiments, an active wing extension 304 may contain multiple CAMDs 318 with multiple control surfaces 312. For example, FIG. 3 illustrates an aircraft 302 with an active wing extension 304 comprising two CAMDs 318 where each CAMD 318 is associated with a control surface 312.

Illustrative Airflow Modification Device Configurations

Figures 4A, 4B, 4C, 4D, 4E, 4F, 4G, 4H:
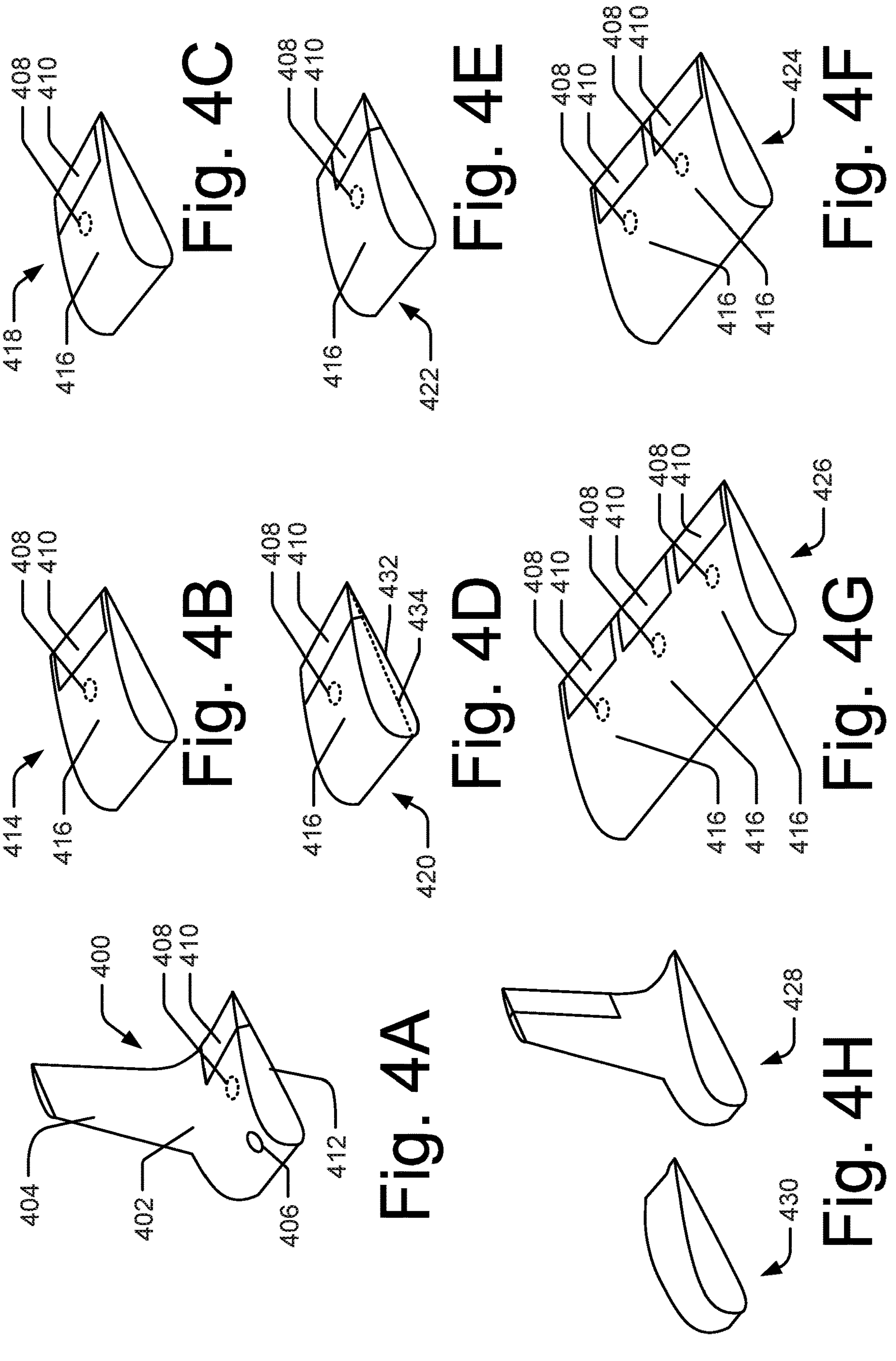
FIGS. 4A-H depict illustrative wing extensions and wingtip devices.

FIGS. 4A-H depict various illustrative embodiments of wing extensions and/or wingtip replacements, CAMDs, and wingtip devices. For example, FIG. 4A shows CAMD 400, which may comprise a horizontal section 402 that may also act as a wing extension to a wing or another extension. CAMD 400 may also comprise a wingtip device 404, for example, a winglet. The wingtip device 404 may be integrated into a CAMD 400 or may be separate from CAMD 400. CAMD 400 may also comprise a sensor 406 to provide flight data to a control system 408. Control system 408 may comprise controller(s) (not shown) and actuator(s) (not shown) configured to control a control surface 410. The control surface 410, as discussed above with respect to control surface 112, may be moved to with respect to the aft portion of the horizontal section 402. CAMD 400 may also comprise, as discussed above with respect to body portion 104, an attachable portion 412 on the inboard side of the horizontal section 402.

FIGS. 4B-E show various illustrative embodiments of wing extensions with CAMDs integrated into the wing extensions. For example, FIG. 4B shows a wing extension 414 that may comprise a CAMD 416. The CAMD 416 may comprise a control system 408 and control surface 410. Control surface 410 may take various forms and span various distances of a wing extension. Wing extensions 414, 418, 420, and 422 show some of the possible configurations of control surface 410. For example, wing extension 414 comprises a control surface 410 that spans a length less than the full length of the wing extension 414 with a section of the wing extension 414 at each end of the control surface 410. The section of the wing extension 414 at each end of the control surface 410 may be, but need not be, equal in size.

FIG. 4C shows wing extension 418 comprising a control surface 410 spanning a length less than the full length of the wing extension 418 with a section of the wing extension 418 at one end of the control surface 410, for example on an inboard end of the wing extension 418. FIG. 4D shows wing extension 420 comprising a control surface 410 spanning the full length of the wing extension 420. FIG. 4E shows wing extension 422 comprising a control surface 410 spanning a length less than the full length of the wing extension 422 with a section of the wing extension 422 at one end of the control surface 410, for example on an outboard end of the wing extension 422.

Though FIG. 4D shows control surface 410 as roughly wedge shaped, the control surface need not follow the profile of an airfoil. For example, the control surface may be a substantially planar.

FIGS. 4F-G show wing extensions that may comprise multiple CAMDs integrated into an extension. For example, FIG. 4F shows wing extension 424, which may comprise two CAMDs 416. FIG. 4G shows wing extension 426, which may comprise three CAMDs 416. The number of CAMDs integrated into a wing extension is not necessarily limited to three. The number of CAMDs may depend upon the aircraft, aircraft configuration, mission, operational environment, desired performance parameters, manufacturing techniques and materials, and hardware, among others. Additionally, as discussed below, multiple wing extensions with one or more CAMDs may be used in coordination with each other to achieve a desired configuration while maintaining a degree of modularity.

FIG. 4H also shows various wingtip devices including a winglet 428 and a wingtip 430. Wingtip devices may include, but are not limited to, winglets, fences, spiroids, raked wingtips, squared-off tips, aluminum tube bow, rounded, Hoerner style, drooped tips, tip tanks, sails, and end plates. Wingtip devices may be used in conjunction with active wing extensions. In some cases, use of an active wing extension may enable use of wingtip devices that the original aircraft was not originally capable of using, for example, winglets. Additionally or alternatively, wingtip devices may or may not include control surfaces, where the control surfaces may or may not be active control surfaces.

The sizing of a CAMD for an aircraft may depend on various factors. For example, the profile of a CAMD or wing extension housing the CAMD may substantially match the airfoil shape 432 and chord 434 of the wing at the point of attachment. In various embodiments this may provide a substantially smooth transition from the baseline wing to the wing extension. However, various embodiments contemplate a disjunctive intersection between the baseline wing and the CAMD or wing extension housing the CAMD. Further, the CAMD or wing extension housing the CAMD may be configured to support effective wing twist across the CAMD or wing extension housing the CAMD.

Additionally, the spanwise length of the wing extension may be based in part on the aircraft, size, structure, configuration, speed, mission, performance, desired performance, and desired mission.

The number of CAMDs that may be integrated into the system may be based on the spanwise length of the wing extension as well as the aforementioned factors. The number of CAMDs desired may also depend on the gross weight of an aircraft. For example, one set of CAMDs may be sufficient for a relatively light aircraft of less than 10,000 lbs operating at relatively low speeds of around 150 knots. Additionally, two or more sets of CAMDs may be preferred for an aircraft greater than 10,000 lbs.

Other factors that may influence the number of CAMDs may be the sizing of the CAMDs including, but not limited to, the control surface size, deflection angle, resulting hinge moment at operating speed of the aircraft and deflection angle, and motor/actuator power and authority.

The control surface size of a CAMD may comprise a chord wise length that may be measured in percentage of the wing extension chord. This value may range from 100% of the wing extension chord (where the entire chord length of the wing extension moves as part of the control surface) to a small percentage, less than 1% of the wing extension chord. In various embodiments, it a control surface may be configured to have a chord length in similar proportion to an adjacent or nearby control surface of the baseline wing, for example, an aileron.

The spanwise length or width of a CAMD may be based on the aforementioned factors as well. Additionally, the spanwise length or width of a CAMD may be based on manufacturing and modularity implications as well. For example, a CAMD may be configured with a set width. This may represent a balance of the aforementioned factors. For example, it may be possible to select a motor of sufficient power and response time to move a control surface sufficiently fast to effect a desired response or movement.

Illustrative Multiple Controllable Airflow Modification Device Configurations

Figure 5A:
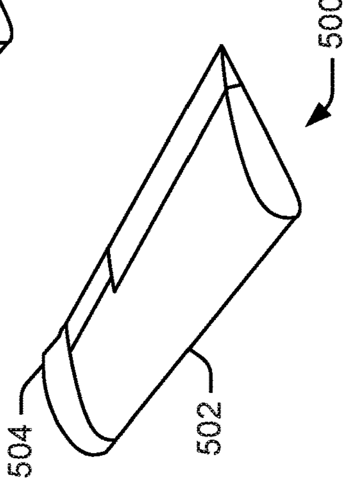
FIGS. 5A-F depict illustrative wing extensions attached to illustrative wings of aircraft.

FIGS. 5A-F depict various illustrative embodiments of wings, wing extensions and/or wingtip replacements, CAMDs, and wingtip devices. For example, FIG. 5A shows a baseline wing 500 comprising a wing section 502 and a wingtip device 504. The baseline wing 500 may or may not include wingtips and/or wingtip devices that may be replaced by a wing extension or extended outwardly by a wing extension.

Figure 5B:
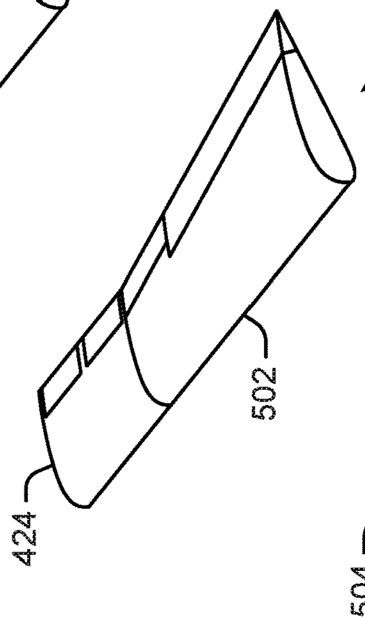

Various embodiments of active wing extensions contemplate changing the baseline wing 500 from an initial configuration to a modified configuration that may incorporate multiple CAMD(s). For example, FIG. 5B shows a modified wing 506 comprising a wing section 502 and wing extension 424. As discussed above with respect to FIG. 4, wing extension 424 comprises multiple CAMDs, for example, two. Modified wing 506 may or may not integrate a wingtip device. For example, modified wing 506 may integrate a squared-off or rounded-off wingtip configuration.

Figure 5C:
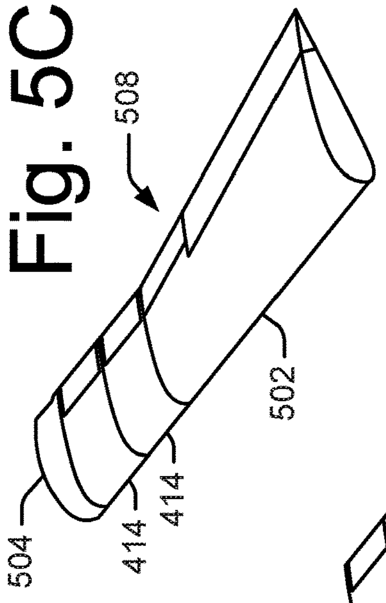

FIG. 5C shows modified wing 508 comprising a wing section 502 and wing extensions 414. In this embodiment, two wing extensions 414 are coupled together adjacent to each other. This approach may create a single effective wing extension built from otherwise modular wing extensions 414. As discussed above with respect to FIG. 4, wing extension 414 comprises a CAMD. Additionally, modified wing 508 may comprise a wingtip feature. In this case, a preexisting wingtip feature 504 may be used.

Figure 5D:
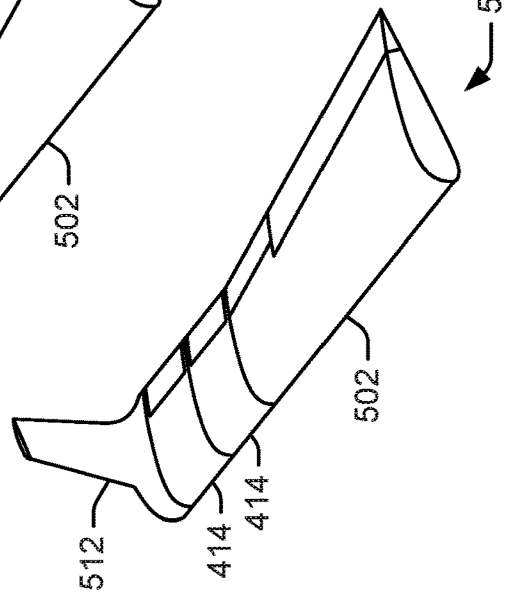

FIG. 5D shows modified wing 510 comprising a wing section 502 and wing extensions 414 adjacent to each other. Here, modified wing 510 may comprise a wingtip feature, for example winglet 512.

Figure 5E:
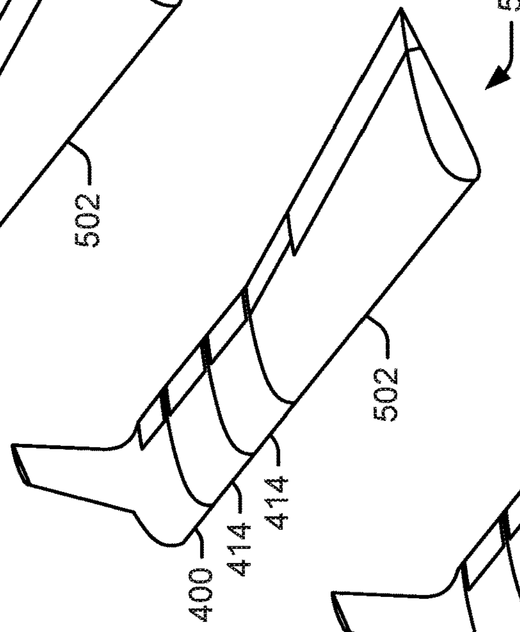

FIG. 5E shows modified wing 514 comprising a wing section 502 and wing extensions 414 adjacent to each other. Here, modified wing 514 may comprise a wingtip feature, for example CAMD 400. As discussed above with respect to FIG. 4, CAMD 400 may comprise a wing extension as well as a wingtip device. In this case, CAMD 400 provides both a wing extension as well as a winglet. This configuration may provide three CAMDs per modified wing 514.

Figure 5F:
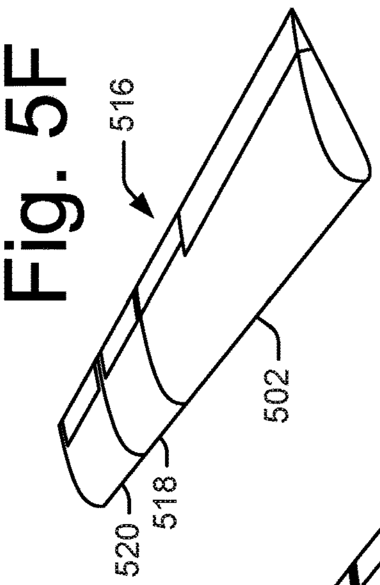

FIG. 5F shows modified wing 516 comprising a wing section 502 and wing extensions 518 and 520 adjacent to each other. Here, the planform geometry of a baseline wing, for example, a taper from root to tip, if present, may be extended through the wing extensions 518 and 520. For example, wing extension 520 may be smaller in planform area when compared to wing extension 518 since wing extension 520 is outboard of wing extension 518 with respect to the baseline wing 502.

As discussed above, a wide range in the number of CAMDs and configuration of CAMDs are possible. This may allow for flexibility and modularity of a system. This may also lead to a lower number of base parts, configurations, and certifications that may be required than would a system that did not provide modularity and created a custom system for each new configuration.

Illustrative Airflow Modification Devices

Figure 6:
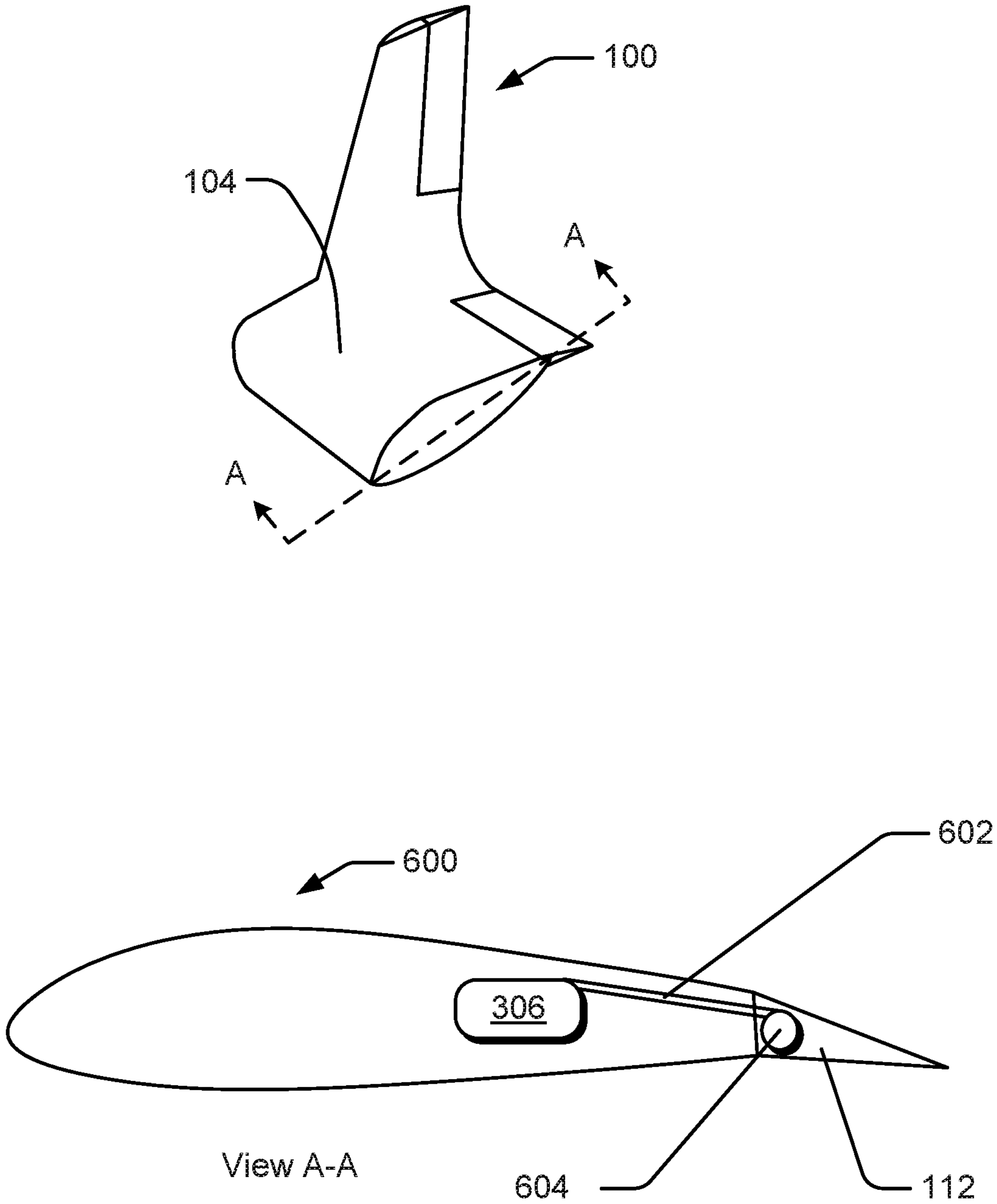
FIG. 6 depicts the illustrative wing extension with a wingtip device of FIG. 1 and a cross-sectional view of the wing extension with a wingtip device, taken along line A-A of FIG. 6.

FIG. 6 depicts the active wing extension 100 of FIG. 1 and includes an end view 600 of the active wing extension 100, taken along line A-A. The end view 600 runs across the body portion 104 of the wing extension 100. Additionally, the end view 600 of the body portion 104 of the wing extension 100 illustrates one embodiment of the components of the control system 306 of FIG. 3 located in the active wing extension 100. As shown in FIG. 6, the control system 306 may be located in the body portion 104 of the wing extension 100; however, the control system 306 may be located in the angled portion 106 of FIG. 1 of the wing extension 100, in other portions of the active wing extension 100, or in any location on the aircraft, including, for example, the fuselage. The control system 306 may also be distributed over various portions of the CAMD, wing extension, and/or aircraft.

In one embodiment, by way of example only, the control system 306 may be communicatively and/or mechanically coupled to the control surface 112 by way of a connection 602. FIG. 3 illustrates the connection 602 as one substantially straight coupling from the control system 306 to the control surface 112. However, the connection 602 may bend, turn, pivot, or be a series of multiple connections to make the connection 602. The connection 602 between the control system 306 and the control surface 112 may be operable by electronic, mechanic, or any other resource for coupling the control surface 112 to the control system 306. The control surface 112 may be coupled to the active wing extension 100 by a hinge, pivot, or other swivel device 604 to allow the control surface 112 to rotate the aft end up and/or down in relation to the body of the active wing extension 100. As noted above, to the commands given by the control system 306 to operate the control surface 112 of the active wing extension may be based on the flight condition data received by the control system 306 from the sensors 114 on the aircraft 302.

Figure 7:
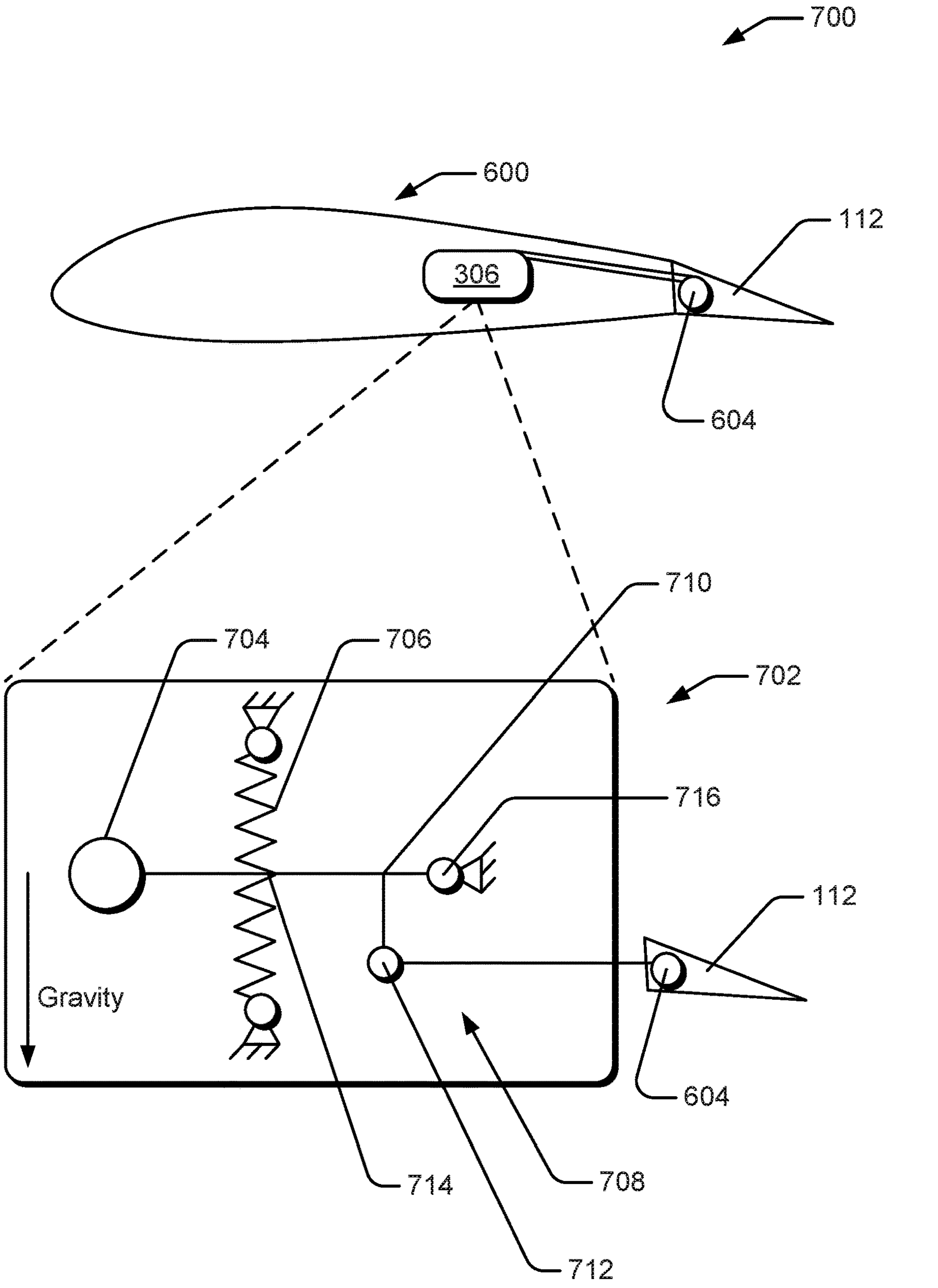
FIG. 7 depicts an illustrative cross-section of the wing extension with a wingtip device of FIG. 1 with a mechanical control system.

FIG. 7 illustrates one embodiment 700 of the control system 306 as seen through the end view 600 of active wing extension 100. As discussed with reference to FIGS. 3 and 6, the control system 306 may control the control surface 112 of the active wing extension 100 based on flight condition data. The control system 306 may be coupled to the control surface 112 which may be illustrative of the airflow modification device 110 illustrated in FIG. 1. The control surface 112 may be coupled to the active wing extension 100 by a hinge, pivot, or other swivel device 304 to allow the control surface 112 to move in relation to the commands given by the control system 306.

Additionally, by way of example only, FIG. 7 depicts an illustrative embodiment of a mechanical control system 702. The mechanical control system 702 may include of a bob weight 704 coupled to a spring 706. The bob weight 704 may be fabricated of lead, or any other weight which may activate the mechanical control system 702. The spring 706 may be made of coil springs, bow springs, or any other device used to create resistance for the bob weight 704. In one embodiment, and by way of example only, the bob weight 704 may be coupled to the control surface 112 by way of a coupling system 708. By way of example only, coupling system 708 may be a rigid object, belt, chain, or other resource for coupling the bob weight 704 to the control surface 112. The coupling system 708 is illustrated by way of example only, with two connection points 710 and 712, and one fixed point 716. The coupling system 708 may also contain a series of pivot points, angles, or other connections. The coupling system 708 may be configured to connect to spring 706 at the point 714.

In one embodiment, the mechanical system 702 may be configured to react to in-flight conditions, for example, a gust of wind, maneuvers produced by one or more pilots, or any other condition on the wing of the aircraft. Based on the in-flight conditions, the bob weight 704 may change position within the mechanical system 702 relative to the spring 706. For example, the bob weight 704 may drop, rise, or otherwise change location, depending on the in-flight conditions. When the bob weight 704 changes location, it may cause the coupling system 708 to initiate a resistance force on the spring 706 causing connection point 710 to move. Consequently, motion of the connection point 710 may adjust connection points 712 such that the coupling system 708 causes the connection 604 to adjust the control surface 112.

Figure 8:
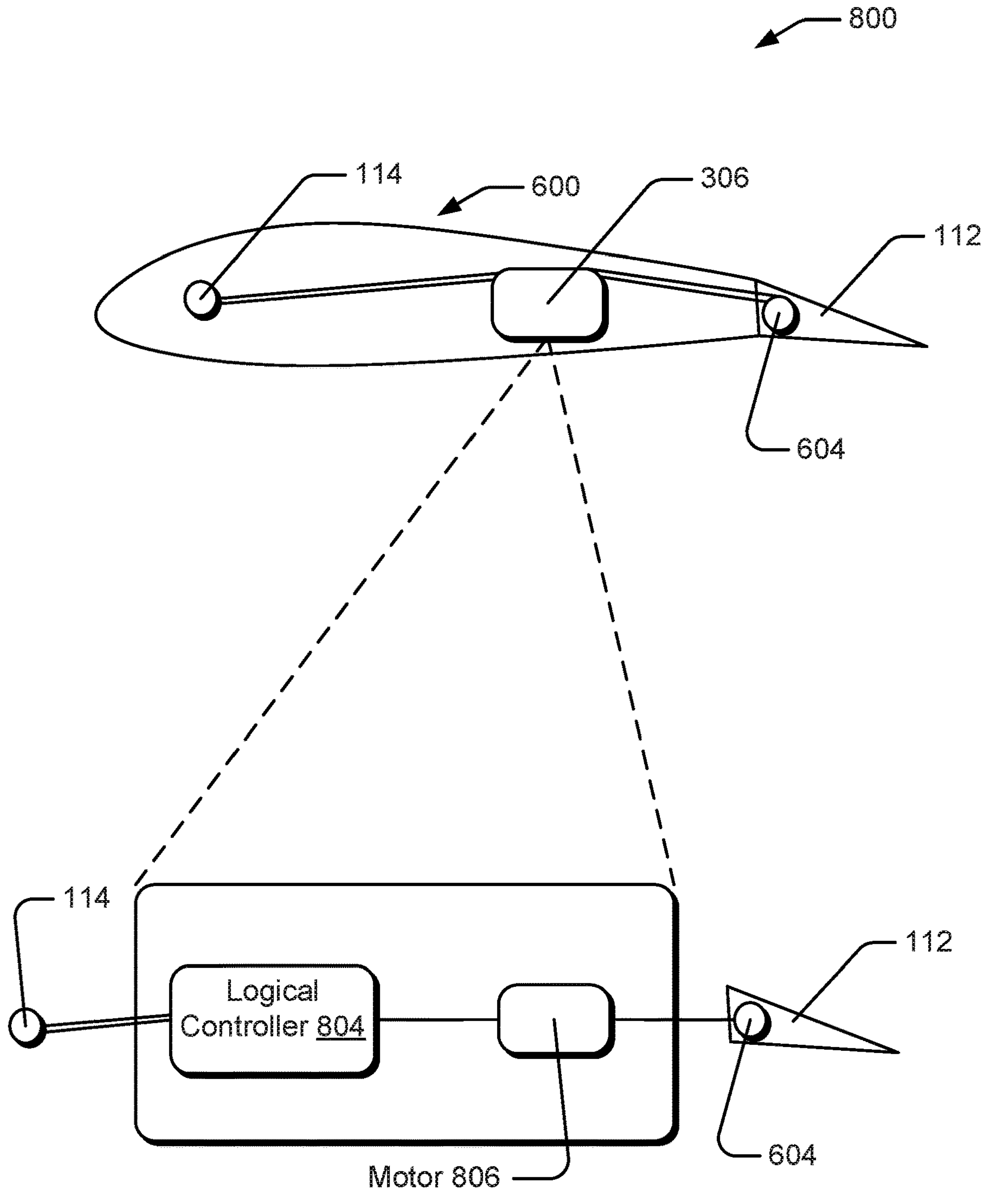
FIG. 8 depicts an illustrative cross-section of the wing extension with a wingtip device of FIG. 1 with a computer controlled control system.

FIG. 8 illustrates an additional embodiment 800 of a logical control system 802 as seen through the end view 600 of active wing extension 100. As discussed with reference to FIGS. 3, 6, and 7, the logical control system 802, much like the control system 306 of FIG. 7, may control the control surface 112 of the active wing extension 100 based on flight condition data. By way of example, and not limitation, the embodiment 800 of FIG. 8 may include one or more sensors 114, a logical controller 804, and an actuator, for example, motor 806. The sensors 114 may be representative of the sensors illustrated in FIG. 1. The sensors 114 may be electronically coupled to the logical controller 804. The logic controller 804 may be coupled to the motor 806. The motor 806, by way of example only, may be an electric motor. In one example, the motor 806 may be coupled to the control surface 112. The motor 806 may be able to rotate the aft portion of the control surface 112 up or down, depending on the received in-flight conditions and the predetermined flight conditions programmed into the logical controller 802. Additionally, the motor 806 may be coupled to the control surface 112 by way of electronic, pneumatic, hydraulic, or another resource for actuating the control surface 112. In at least one embodiment, and by way of example only, the motor 806 may cause the control surface 112 to pivot on an axis, moving the aft portion up and or down to adjust the control surface 112 as calculated by the logical controller 802.

The logical controller 804 may be located in the active wing extension 100, the cockpit (not shown), the main fuselage of the aircraft (not shown), or anywhere located in or on the aircraft. Flight condition data may be first received by the sensors 114 located on the aircraft 302. The information may be resulting from deliberate in-flight maneuvers by a pilot, gusts of wind, or other causes of change in conditions to the aircraft. Information gathered by the sensors 114 may be received by the logical controller 804 and the data may be analyzed or otherwise processed. In one example, the logical controller 804 may be programmed with predetermined flight conditions which may be representative of a specific make and model of the aircraft. Additionally, the logical controller 804 may calculate the position of the control surface 112 based on the in-flight conditions to minimize the moment load on the wing. In other words, the logical controller 804 may receive the in-flight conditions and determine the needed position of the control surface 112. Additionally, the logic controller 804 may send a signal to the motor 806 to which it may be coupled to effectuate control of the control surface 112. By way of example only, the motor 806 may be electronic, pneumatic, hydraulic, or any other type of motor.

Illustrative Comparison Graphs

Figure 9:
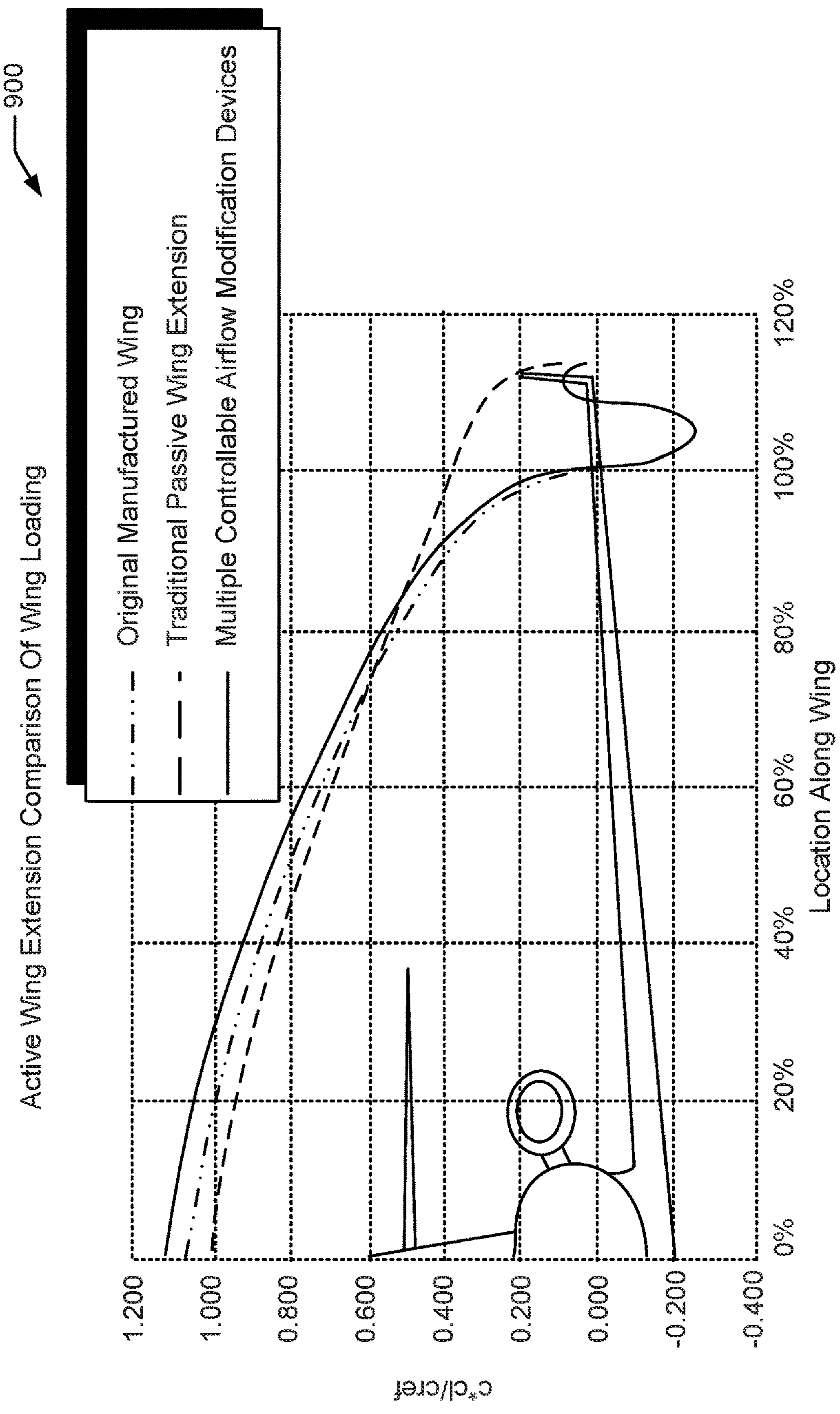
FIG. 9 depicts a design load comparison graph.

FIG. 9 illustrates a graph 900 which compares the local normalized lift coefficient or lift distribution on a wing of an aircraft in relation to the location on the wing of the aircraft. The wing of FIG. 9 is a general representation of a wing and is not made representative of a specific make or model of an aircraft wing. The X-axis of the graph is illustrative of the location on the wing. It is represented in percentage (%) of the semi-span of the wing. The length of the wing is only a representation and is not limiting of the size of the wing on which an active wing extension 100 may be installed. The Y-axis is representative of the lift distribution on the wing. The load is higher the closer to the center of the airplane. The graph 900 is for illustrative purposes only, and illustrates one example of the load distribution which an aircraft may experience. The graph 900 is not restrictive of whether or not the distributed load may be more or less at any point on the graph. The graph 900 is representative of the basic shape of the distributed load a wing may encounter.

The graph 900 illustrates the lift distribution on a traditional manufactured wing, which is represented by the line on the graph 900 with a dash and two dots. The graph 900 also illustrates the lift distribution on the wing when a traditional wing extension with a wingtip device, for example, a winglet, is installed, which is represented by the dashed line. Additionally, the graph 900 illustrates the lift distribution on the wing when an active wing extension 100 with a wingtip device is incorporated on the wing.

The comparison illustrates that the lift distribution caused by the traditional wing extension with a wingtip device, for example, a winglet, may be greater at the wingtip. This may move the center of lift of the wing outboard which may increase the wing bending loads. However, when the wing has an active wing extension 100 utilizing the load alleviation system 300 the lift distribution at the wingtip may drop significantly lower than that of a traditional winglet. The graph 900 illustrates that the load may even drop below zero at the location of the wingtip (the point furthest away from the aircraft). These loads are representative of the design load on the aircraft, which is the highest load an aircraft may see.

When the active wing extension controllable surfaces 112 are undeployed, the active wing extension 100 produces the same efficiency benefits of a passive or fixed winglet. When the local normalized lift coefficient increases and the loads on the wing increase, the control surfaces 112 on the wing extension 100 may adjust to reduce the loads on the wing. In one embodiment, the airflow control surfaces 112 may be undeployed or undeflected the majority of the time. However, in another embodiment, they may only be deployed when the load on the wing approaches the original design loads.

Figure 10:
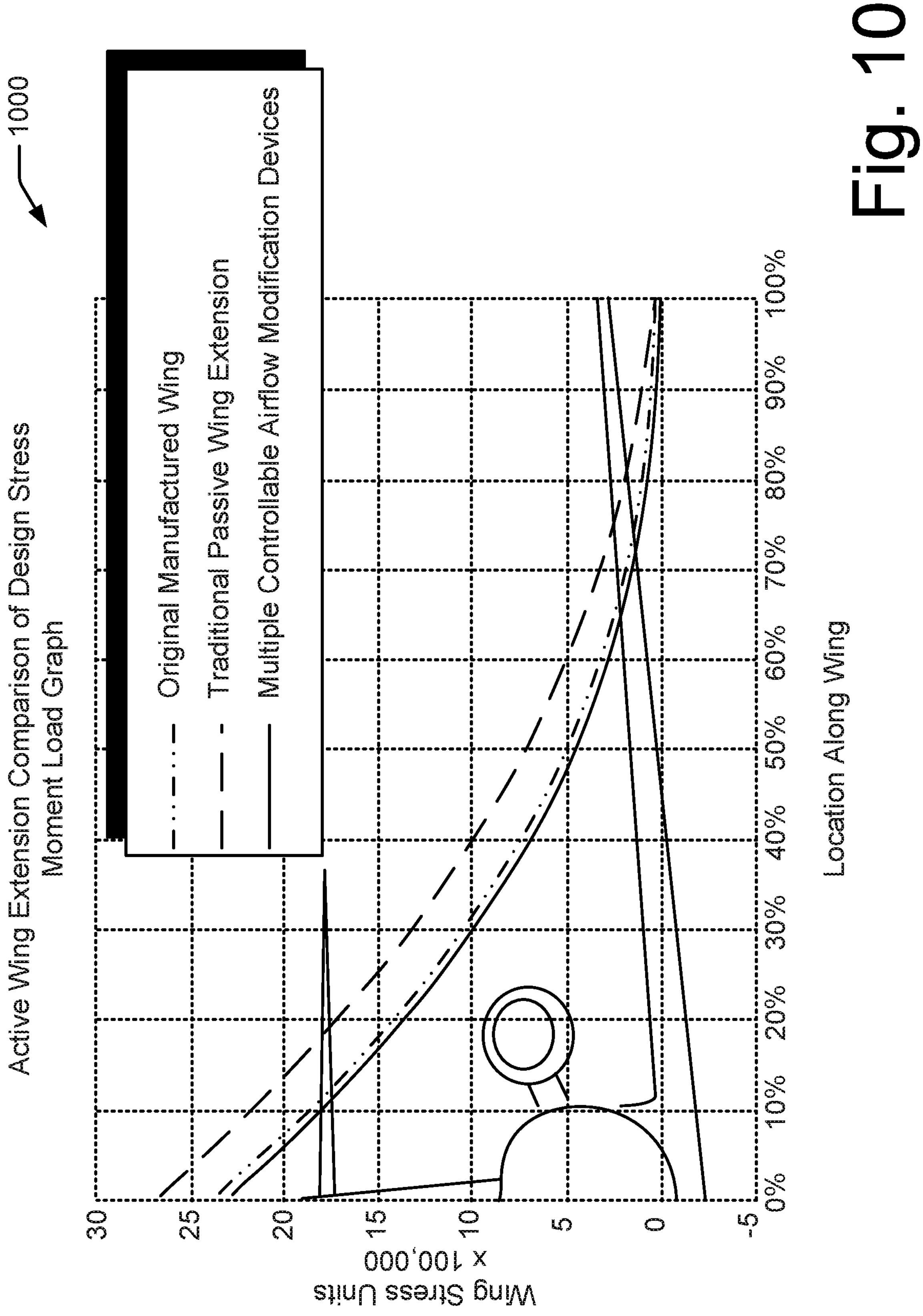
FIG. 10 depicts a design stress and moment load comparison graph.

FIG. 10 illustrates a graph 1000 representing a wing design stress comparison of active wing extension systems, a wing with a winglet with no active system, and a standard wing. The design stress or design load is the critical load to which the wing structure is designed to carry. The X-axis represents the location along the length of an aircraft's wing. The unit is shown in percentage (%) of wing semi-span. The length of the wing is only a representation and is not limiting of the size of the wing on which an active wing extension 100 may be installed. Additionally, in FIG. 10, the Y-axis represents the load on the wing. This load is illustrative of the design root bending moment load. The comparison shows the standard load that the wing bears. The graph 1000 is for illustrative purposes only and is not meant to be restrictive in any way. The root bending moment load may be greater or smaller for varying wing makes and models. The graph 1000 also shows the load of a wing when a wing extension and/or winglet is added with no active systems. The graph 1000 additionally shows the loads on the wing when a wing extension and/or winglet is added to the wing.

With the load alleviation system 300 enabled on the wing extension 100 the design moment loads may be lower than the design loads on the wing with a winglet with no active system. Additionally, with the load alleviation system 300 enabled on the wing extension 100, the moment loads may be lower than the loads on the wings with no wing extensions and/or winglets installed. Traditional winglets and extensions increase wing stress, as a function of load factor, and substantially reduce the fatigue life of the wing. The slope of the "stress per g" curve is normally linear and the addition of passive winglets increases the slope which reduces the expected life and calculated life of the wing. Active wing extensions reduce the slope of this curve so that it is the same or lower than the slope of the original curve.

Illustrative Control of Airflow Modification Devices

As discussed above, a controller may receive in flight data reflecting a current flight condition the aircraft may be encountering, for example, a gust or maneuver. This data may be provided by a sensor within the aircraft and may be converted into or received by the controller in the form of flight condition data. Based on this data, a controller may cause a control surface to move, if desirable, to respond to the current flight condition. For example, if an aircraft encounters a gust in the vertical direction, the sensor may sense the gust, for example, through a change in voltage from an accelerometer, and transmit that data to a controller. The controller may receive this data and adjust one or more CAMDs of a wing extension. The adjustment may cause a control surface of a CAMD to deflect reducing the lift generated by the wing extension.

In various embodiments and flight regimes, the reaction time may impact the effectiveness of a CAMD at alleviating loads on wing extension caused by gusts and/or maneuvers. By way of a non-limiting example, CAMDs according to this application may be configured to provide an initial response of a controller within 10 milliseconds (ms) of detection of a gust or maneuver, and to complete an initial movement of a control surface of the CAMD within 500 ms of the detection. In various embodiments, a controller according to this application may be configured to cause a control surface to begin moving within 8 ms of a detection of a disturbance and complete an initial movement of a control surface within 100 ms. Various embodiments may contemplate quicker or slower response and completion times.

Control of multiple CAMDs in a wing extension may be independent of each other, or control of the CAMDs may be coordinated. For example, independent control of each CAMD in a wing extension may provide for a simultaneous response and deployment of each CAMD. In that case, a control system or control systems responding to the same in-flight data may cause similar CAMDs to have similar or the same responses. In embodiments where wing extensions have more than one CAMD, control factors may be configured to be adjustable. Those control factors may include initial values, thresholds, and initial response settings to address the number and responsiveness of individual CAMDs.

Various embodiments provide for coordinated responses of multiple CAMDs of a wing extension. The coordinated response may comprise causing the multiple CAMDs to respond at the same time. As a non-limiting example, a wing extension having two CAMDs may be configured to deploy the CAMDs in a coordinated and synchronized response where both CAMDs initially deploy at the same time. In that case, the CAMDs may be deployed by a same or different deflection. In various embodiments, a wing extension having two CAMDs may be configured to cause a first CAMD located inboard of a second CAMD to initially deploy with a smaller deflection than the second CAMD. Additionally or alternatively, the wing extension having two CAMDs may be configured to cause the first CAMD located inboard of a second CAMD to initially deploy with a larger deflection than the second CAMD.

Additionally or alternatively, the coordinated response may comprise causing the multiple CAMDs to respond at staged or staggered times. For example, the first CAMD that is located inboard of the second CAMD may initially deploy after the second outboard CAMD. The second CAMD may deploy if/when a gust or maneuver exceeds a first load factor/stress threshold. The first CAMD may deploy subsequent to the deployment of the second CAMD if/when a gust or maneuver exceeds a second higher load factor/stress threshold. The first and second load factor/stress thresholds may be configured to maintain spanwise section loads at or below originally designed values for a given wing without a wing extension.

Additionally or alternatively, the first CAMD that is located inboard of the second CAMD may initially deploy before the second outboard CAMD. The first CAMD may deploy if/when a gust or maneuver exceeds a first load factor/stress threshold. In this case, the second CAMD may deploy subsequent to the deployment of the first CAMD if/when a gust or maneuver exceeds a second higher load factor/stress threshold. The first and second load factor/ stress thresholds may be configured to maintain spanwise section loads at or below originally designed values for a given wing without a wing extension.

Further, as an illustrative and non-limiting example, in various embodiments contemplating a coordinated deployment of multiple CAMDs, deployment of the second CAMD to a greater degree when compared to the first CAMD may be thought of as a coarse response. Further, the deployment of the first CAMD to may be thought of as a fine or vernier adjustment.

FIGS. 11A-D depict an illustrative embodiment where multiple CAMDs are coordinated in their deployment. FIG. 11A shows an active airflow modification system 1100 that may be implemented on an aircraft (not shown) having a wing 1102. The active airflow system may comprise a wing extension 1104 comprising a first CAMD 1106 and a second CAMD 1108. The first CAMD 1106 may be located outboard of the second CAMD 1108 with respect to the wing 1102. The first CAMD 1106 may comprise a controller (not shown) and a control surface 1110 while the second CAMD 1108 may comprise a controller (not shown) and a control surface 1112.

As discussed above, in various embodiments, wing extension 1104 may be configured to cause the first CAMD 1106 to deploy control surface 1110 to a greater degree/magnitude/deflection when compared to the control surface 1112 of the second CAMD 1108.

FIGS. 11B-D show three additional views of the active airflow modification system 1100. For example, FIG. 11B depicts a view of the active airflow system 1100 from the trailing edge of the wing 1102 and wing extension 1104. FIG. 11C depicts a view of the active airflow modification system 1100 along the C-C view plane shown in FIG. 11B. FIG. 11C also depicts a controller 1114 of CAMD 1108 that may cause control surface 1112 to deploy. FIG. 11C depicts a view of the active airflow modification system 1100 along the C-C view plane shown in FIG. 11B where control surface 1112 is deployed to a first position 1116 at an angle θ (theta) as measured from an undeployed position 1118. FIG. 11C also shows control surface 1110 deployed to a second position 1120 at an angle ϕ (phi) as measured from an undeployed position 1118.

Illustrative Aircraft with Active Wing Extensions

Figure 12:
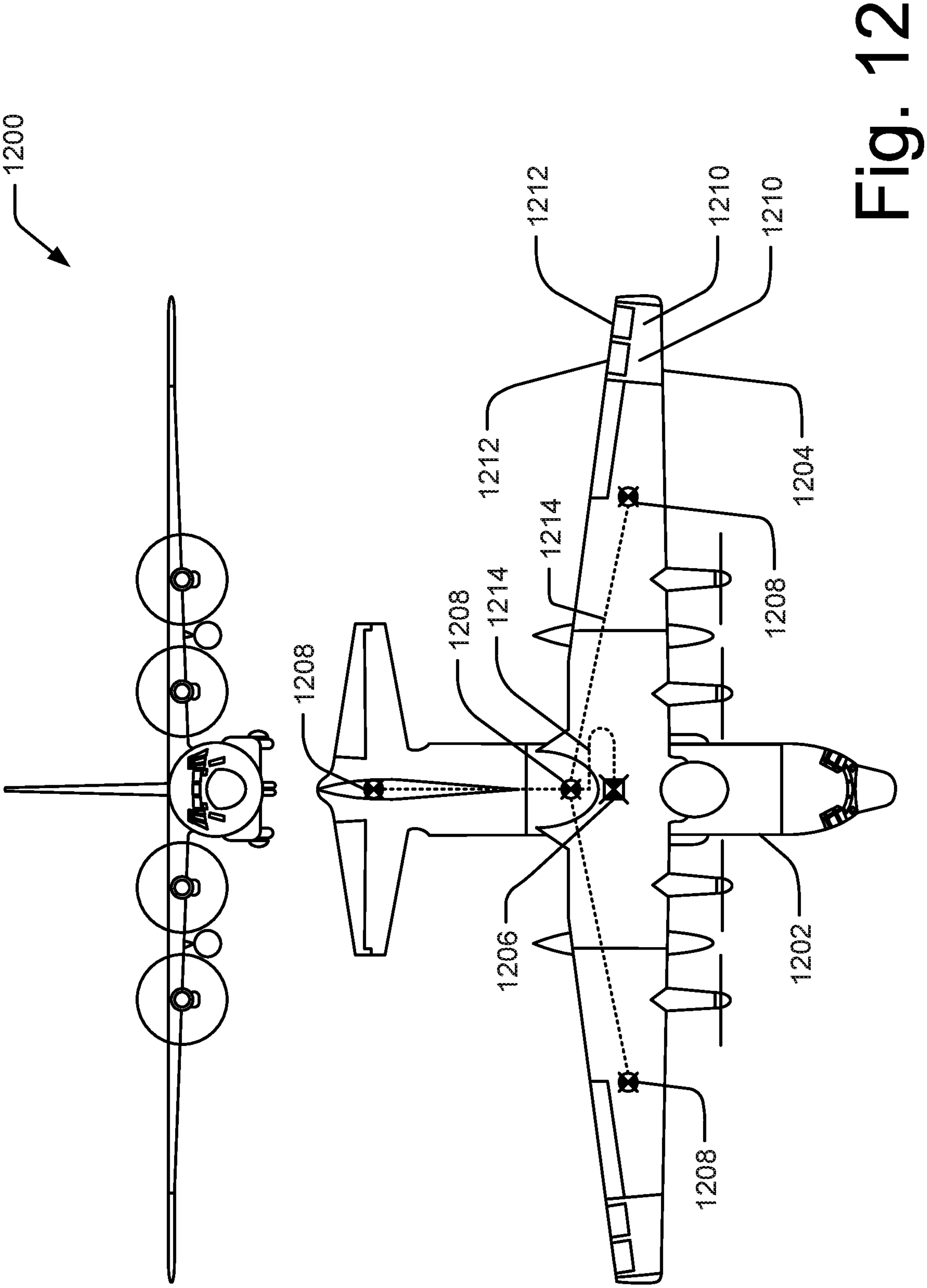
FIG. 12 depicts an aircraft with attached illustrative wing extensions according to one embodiment.
Figure 13:
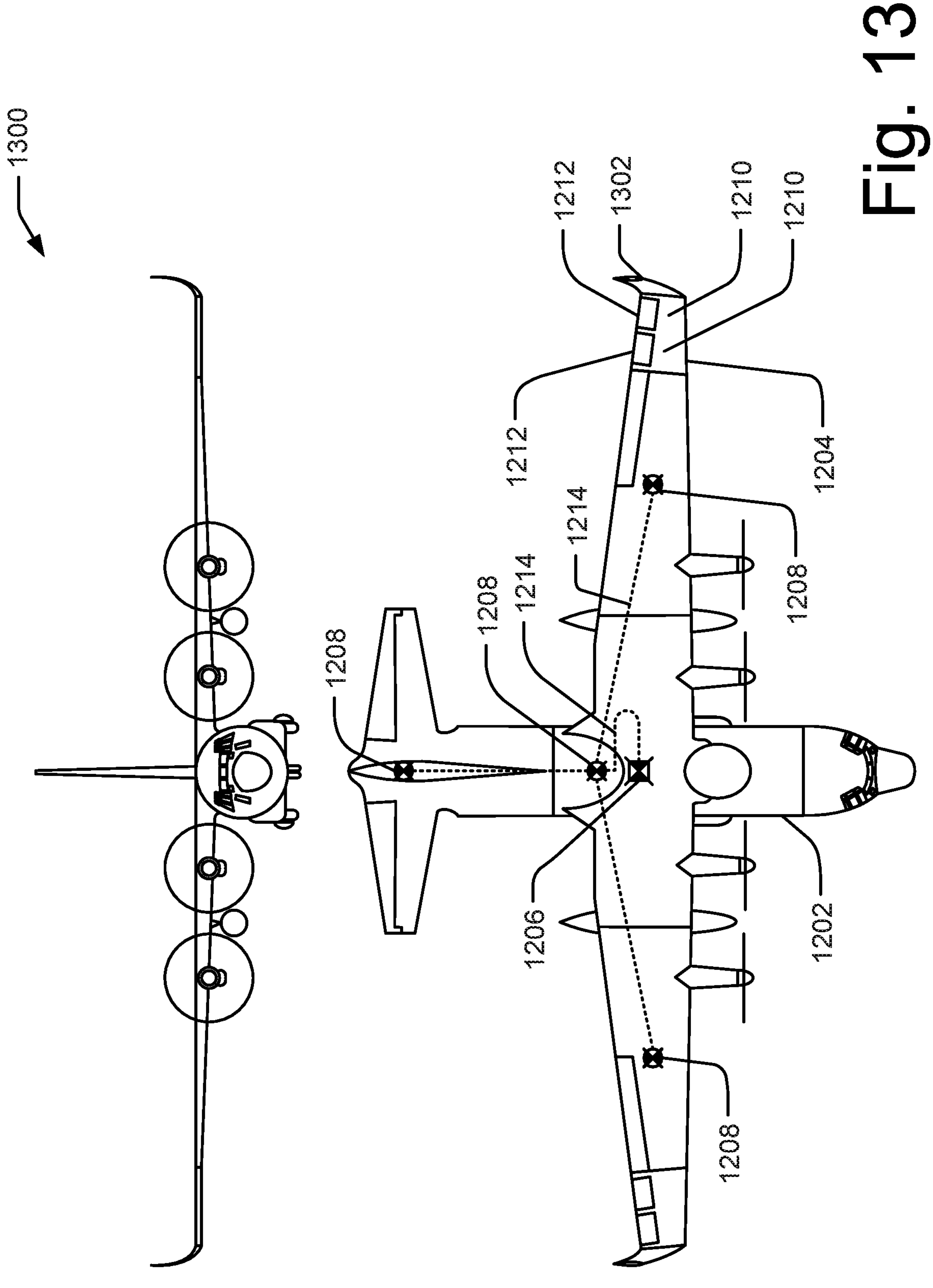
FIG. 13 depicts an illustrative aircraft with attached illustrative wing extensions with vertically extending wingtip devices according to another embodiment.

FIGS. 12 and 13 depict illustrative embodiments of aircraft with active wing extensions. For example, FIG. 12 depicts an illustrative active airflow modification system 1200 implemented on an aircraft 1202 that includes at least one attached active wing extension 1204. The components of the active airflow modification system 1200 may include active wing extension(s) 1204, a control system 1206, sensors 1208, CAMD(s) 1210, and control surface(s) 1212.

As mentioned above, the active airflow modification system 1200 may comprise a control system 1206. The control system 1206 may be configured to control the active wing extensions 1204 of the aircraft 1202. The control system 1206 may collect and/or receive data from sensors 1208. This data may be transferred over data connection(s) 1214. In various embodiments, active airflow modification system 1200 may be integrated with or separate from auto-pilot and/or fly-by-wire systems of the aircraft. Stated another way, the control system 1206 may be configured to control the CAMDs independently of or in coordination with or by an auto-pilot and/or a fly-by-wire system of the aircraft.

As mentioned above, the active airflow modification system 1200 may comprise active wing extension(s) 1204, CAMD(s) 1210, and control surface(s) 1212. In various embodiments, an active wing extension 1204 may contain multiple CAMDs 1210 with multiple control surfaces 1212. For example, FIG. 12 illustrates an aircraft 1202 with an active wing extension 1204 comprising two CAMDs 1210 where each CAMD 1210 is associated with a control surface 1212.

An example of the active airflow modification system 1200 implemented on an aircraft 1202, such as a C-130 with an approximately six foot wing extension installed. The resulting extensions may increase the range of the aircraft without increasing the operating stresses thereby negating the requirement to perform a detailed stress analysis of strengthening the aircraft structure, including, for example, the wings. This embodiment may provide for a wing extension comprising two CAMDs for each wing. This approach may allow for installation of the active wing extensions with or without integration into or modification of existing control systems, including, but not limited to, auto pilot, OEM control surfaces, and hydraulic systems. Installation of an active wing extension system may be accomplished as an aftermarket addition and need not be installed during construction of an aircraft.

FIG. 13 depicts an illustrative active airflow modification system 1300 implemented on an aircraft 1202 that includes at least one attached active wing extension 1204. The active airflow modification system 1300 is similar to the active airflow modification system 1200. However, the active airflow system 1300 incorporates wingtip devices, for example, winglets 1302. Incorporation of winglet 1302 may cause different thresholds and parameters to be used than those employed in active airflow modification system 1200 when all other factors are equal.

Illustrative Methods

Figure 14:
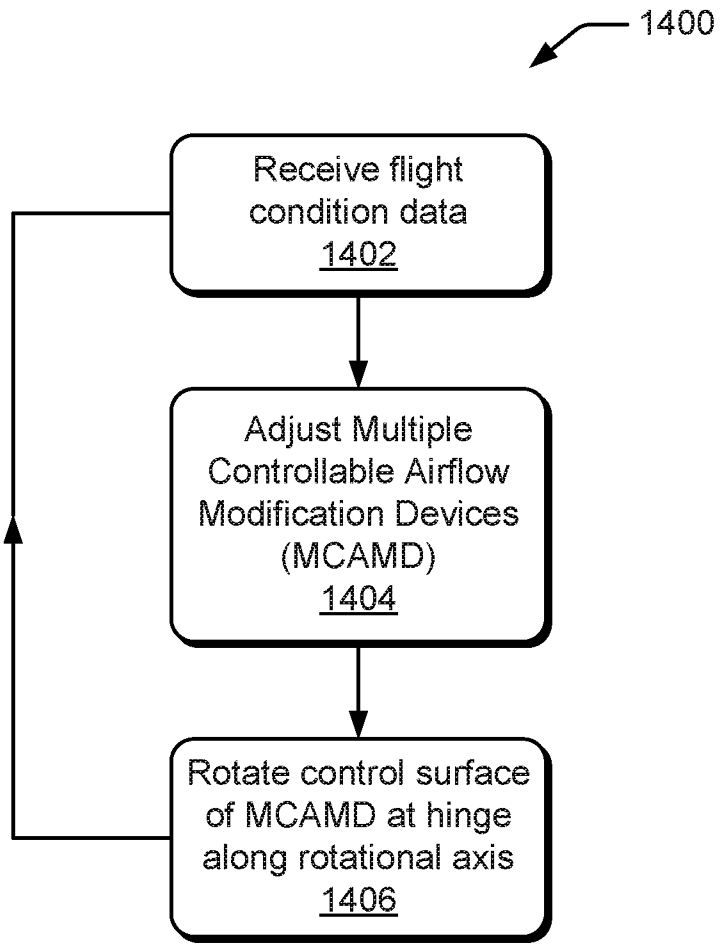
FIG. 14 depicts a flowchart illustrating operation of multiple controllable airflow modification devices.

FIG. 14 is a flowchart of one illustrative method 1400 of operating multiple controllable airflow modification devices. As discussed above the sensors receive data based on the flight conditions of the aircraft. The method may, but not necessarily, be implemented by using sensors and control systems described herein. For ease of understanding, the method 1400 is described in the context of the configuration shown in FIGS. 3 and 11A-D. However, the method 1400 is not limited to performance using such a configuration and may be applicable to other aircraft and other types of wing extensions.

In this particular implementation, the method 1400 begins at block 1402 in which a control system, such as control system 306, receives data from one or more sensors, such as sensors 314, located in or on the aircraft 302. The data received from the sensors may comprise flight condition data that may include, but is not limited to, in-flight load factor data, airspeed data, aircraft weight data, and/or altitude data.

At block 1404, one or more CAMDs may be adjusted. Adjustment of the CAMDs 318 may be based in part on the data received at block 1402. For example, flight condition data is received as a signal and interpreted by control logic 316 using parameters 320. The control logic 316 may determine operation of the control surface(s) 312, such as determining a position or positions to deploy the control surface(s) 312. For example, the control logic 316 may determine that a control surface 1110 should be deployed to position 1120 as shown in FIG. 11D. Control logic 316 may generate a signal to cause the control surface to move.

At block 1406, the signal from control logic 316 is received by an actuator or controller, for example controller 1114 as shown in FIG. 11C. The actuator or controller may then actuate and/or cause a control surface to deploy. In various embodiments, the control surface is deployed by rotating at a hinge along a rotational axis. For example, controller 1114 may cause control surface 1112 to deploy to position 1116. Control surface may be adjusted to position 1116 from another position. For example, control surface 1112 may initially be at an angle greater or less than θ (theta) and deployed to position 1116.

In various embodiments, method 1400 is repeated to provide adjustments of the multiple CAMDs over the course of a flight accounting for changes in the flight condition of the aircraft.

Various embodiments of method 1400 provide for adjusting CAMDs of a plurality of CAMDs independently of other CAMDs. For example, at block 1404, control logic 316 may be configured to determine a position of a control surface of a first CAMD of the plurality of CAMDs independent of a control surface of a second CAMD of the plurality of CAMDs. At block 1406, based in part on the control logic 316, a first CAMD of the plurality of CAMDs is adjusted independent of a second CAMD of the plurality of CAMDs. In some cases, this may cause the first and second CAMDs to react in substantially the same manner since each CAMD may react independently to the same flight condition data.

Various embodiments of method 1400 provide for adjusting the plurality of CAMDs in coordination with one another. For example, at block 1404, control logic 316 may be configured to determine a position of a control surface of a first CAMD of the plurality of CAMDs in coordination with a control surface of a second CAMD of the plurality of CAMDs. At block 1406, based in part on the control logic 316, a first CAMD of the plurality of CAMDs may be adjusted in coordination with a second CAMD of the plurality of CAMDs. In various embodiments the magnitude of responses between the CAMDs of the plurality of the CAMDs may be different. For example, adjusting a first CAMD of the plurality of CAMDs provides a first control response. Adjusting a second CAMD of the plurality of CAMDs provides a second control response.

In some instances the magnitude of the second control response may be greater than the first control response. For example, control logic 316 may provide a first signal causing control surface 1110 of the first CAMD 1106 to move to position 1120 at an angle ϕ (phi) measured from undeployed position 1118 generating a first control response. Control logic 316 may also provide a second signal causing control surface 1112 of the second CAMD 1108 to move to position 1116 at an angle θ (theta) measured from undeployed position 1118 generating a second control response. In various embodiments, angle ϕ (phi) may be greater or less than angle θ (theta). In various embodiments, angle ϕ (phi) may be greater than zero, while angle θ (theta) may be substantially equal to zero. Additionally or alternatively, angles ϕ (phi) and θ(theta) may be the same or substantially similar configuring at least a subset of the plurality of CAMDs to act synchronously.

In various embodiments and configurations, coordinated control as discussed above may be configured to cause an outboard CAMD to provide a coarse adjustment, which may comprise a larger initial response, while an inboard CAMD provides a fine adjustment, which may comprise a smaller initial response when compared to the initial response of the outboard CAMD. An example of this may be seen in FIGS. 11A-D. Additionally or alternatively, an inboard CAMD may be configured to provide a coarse adjustment and an outboard CAMD may be configured to provide a fine adjustment.

CONCLUSION

Although embodiments have been described in language specific to structural features and/or methodological acts, it is to be understood that the disclosure and appended claims are not necessarily limited to the specific features or acts described. Rather, the specific features and acts are disclosed as illustrative forms of implementing the embodiments. For example, the methodological acts need not be performed in the order or combinations described herein, and may be performed in any combination of one or more acts.

What is claimed is:

1. An aircraft comprising:
- a fuselage;
- a baseline wing including a first end and a second end, the baseline wing coupled to the fuselage at the first end; and
- a flow modification device including:
  - a first portion coupled to the second end of the baseline wing,
  - a first control surface disposed on the first portion,
  - a first actuator configured to adjust at least a portion of the first control surface to reduce a load on the baseline wing,
  - a second control surface disposed on the first portion,
  - a second actuator configured to adjust at least a portion of the second control surface to reduce the load on the baseline wing, and
  - a second portion extending at an oblique angle relative to the first portion.

2. The aircraft of claim 1, wherein:
- the baseline wing includes an aileron disposed between the first end and the second end and inboard of at least one of the first control surface or the second control surface; and
- the aileron is configured to be controlled independently of the first control surface and the second control surface.

3. The aircraft of claim 1, wherein the flow modification device comprises at least one of a winglet, a wingtip, or a wing extension.

4. The aircraft of claim 1, wherein the flow modification device further includes:
- a third control surface; and
- a third actuator configured to adjust at least a portion of the third control surface to reduce the load on the baseline wing.

5. The aircraft of claim 1, wherein the first control surface and the second control surface are configured to be controlled independently.

6. The aircraft of claim 1, wherein the first control surface and the second control surface are configured to be at least partially controlled simultaneously.

7. The aircraft of claim 1, wherein based at least in part on a signal indicative of sensor data generated via one or more sensors located onboard at least one of the aircraft or the flow modification device, at least one of:
- the first actuator is configured to adjust the first control surface; or
- the second actuator is configured to adjust the second control surface.

8. The aircraft of claim 1, wherein the second control surface is located outboard of the first control surface.

9. The aircraft of claim 1, wherein the first portion is oriented substantially parallel to the baseline wing.

10. A flow modification device configured to couple to a wing of an aircraft, the flow modification device comprising:

a first portion configured to couple to the wing;

a second portion;

a first actuator;

a first control surface disposed at least partially along the first portion, wherein the first actuator is configured to adjust at least a portion of the first control surface to alleviate a load on the wing;

a second actuator; and a second control surface disposed at least partially along the first portion, wherein the second actuator is configured to adjust at least a portion of the second control surface to alleviate the load on the wing.

11. The flow modification device of claim 10, wherein the second portion is disposed at an oblique angle relative to the first portion.

12. The flow modification device of claim 10, wherein the second control surface is located outboard of the first control surface and inboard of the second portion.

13. The flow modification device of claim 10, wherein the flow modification device comprises at least one of a winglet, a wingtip, or a wing extension.

14. The flow modification device of claim 10, wherein the flow modification device is configured to couple to the wing at a location outboard of an aileron of the aircraft and inboard of at least one of the first control surface or the second control surface.

15. The flow modification device of claim 14, wherein at least one of the first control surface or the second control surface is configured to be controlled independently of the aileron.

16. The flow modification device of claim 10, wherein the flow modification device is configured to receive a signal indicative of sensor data generated via one or more sensors located onboard at least one of the aircraft or the flow modification device.

17. The flow modification device of claim 16, wherein at least one of:

the first actuator is configured to adjust the at least the portion of the first control surface based at least in part on the signal; or the second actuator is configured to adjust the at least the portion of the second control surface based at least in part on the signal.

18. The flow modification device of claim 10, wherein the flow modification device is configured to receive a signal associated with adjusting at least one of the at least the portion of the first control surface or the at least the portion of the second control surface.

19. The flow modification device of claim 10, further comprising a controller configured to cause at least one of:

the first actuator to adjust the at least the portion of the first control surface; or the second actuator to adjust the at least the portion of the second control surface.

20. The flow modification device of claim 10, wherein the first control surface and the second control surface are configured to be adjusted independently.

21. The flow modification device of claim 10, wherein the first control surface and the second control surface are configured to be at least partially adjusted simultaneously.

22. The flow modification device of claim 10, further comprising:

a third control surface; and a third actuator configured to adjust at least a portion of the third control surface to reduce the load on the wing.

23. The flow modification device of claim 10, wherein the second actuator is actuated based at least in part on actuation of the first actuator.

24. A method comprising:

receiving a signal indicative of sensor data generated via one or more sensors located onboard an aircraft, the aircraft including a flow modification device coupled to a wing of the aircraft, the flow modification device having:

a first control surface with a length that is oriented substantially parallel to a length of the wing, and a second control surface with a length that is oriented substantially parallel to the length of the wing; and adjusting, based at least in part on the signal, at least one of:

a portion of the first control surface via actuation of a first actuator, or a portion of the second control surface via actuation of a second actuator.

25. The method of claim 24, wherein the flow modification device comprises at least one of a winglet, a wingtip, or a wing extension coupled to the wing of the aircraft.

26. The method of claim 24, wherein at least one of the first control surface or the second control surface is configured to be adjusted independently of an aileron of the aircraft.

27. The method of claim 26, wherein the first control surface is located outboard of the aileron.

28. The method of claim 24, wherein the signal is received from at least one of the one or more sensors or a device located onboard the aircraft.

29. The method of claim 24, further comprising determining, based at least in part on the signal, at least one of:

a first adjustment to the at least the portion of the first control surface via the first actuator; or a second adjustment to the at least the portion of the second control surface via the second actuator.

30. The method of claim 24, wherein:

the flow modification device includes:

a first portion, and a second portion that extends at an oblique angle relative to the first portion; and at least one of the first control surface or the second control surface is disposed at least one of on, in, or coupled to the first portion.

31. The method of claim 24, wherein the first control surface and the second control surface are configured to be adjusted independently.

32. The method of claim 24, wherein the first control surface and the second control surface are configured to be at least partially adjusted simultaneously.

* * * * *